United States Patent [19]

Kuwana et al.

[11] Patent Number: 5,016,178

[45] Date of Patent: May 14, 1991

[54] BRAKE PRESSURE CONTROL APPARATUS

[75] Inventors: Kazutaka Kuwana, Toyota; Tsuyoshi Yoshida, Obu; Shinsuke Sakane, Toyota, all of Japan

[73] Assignee: Aisin Seiki Kabushiki Kaisha, Kariya, Japan

[21] Appl. No.: 501,951

[22] Filed: Mar. 29, 1990

Related U.S. Application Data

[63] Continuation of Ser. No. 230,228, Aug. 9, 1988, abandoned.

[30] Foreign Application Priority Data

Aug. 20, 1987 [JP] Japan .................................. 62-206655

[51] Int. Cl.⁵ .............................................. B60T 8/64
[52] U.S. Cl. .................................. 364/426.02; 303/97; 303/110
[58] Field of Search ................... 364/426.02; 180/197; 303/95, 97, 99, 105, 110

[56] References Cited

U.S. PATENT DOCUMENTS

| 3,985,396 | 10/1976 | Kuwana et al. | 364/426.02 |
| 4,682,295 | 7/1987 | Kubo | 364/426.02 |
| 4,741,580 | 5/1988 | Matsubara et al. | 364/426.02 |
| 4,748,564 | 5/1988 | Matsuda | 364/426.02 |
| 4,790,607 | 12/1988 | Atkins | 303/110 |

FOREIGN PATENT DOCUMENTS 54789 5/1974 Japan .

Primary Examiner—Gary Chin
Attorney, Agent, or Firm—Finnegan, Henderson, Farabow, Garrett and Dunner

[57] ABSTRACT

Brake control apparatus, having an antiskid control for decreasing skidding of wheels are provided by segmenting a brake control mode into three domains or more including "reducing", "hold" and "intensifying". A minimal memory capacity is provided to store constants for specifying functions indicating boundaries of the control mode domains, and the constants are particularly given to coordinate with a cars deceleration. Thus, uniformity may be obtained between resulting operations and decisions.

4 Claims, 17 Drawing Sheets

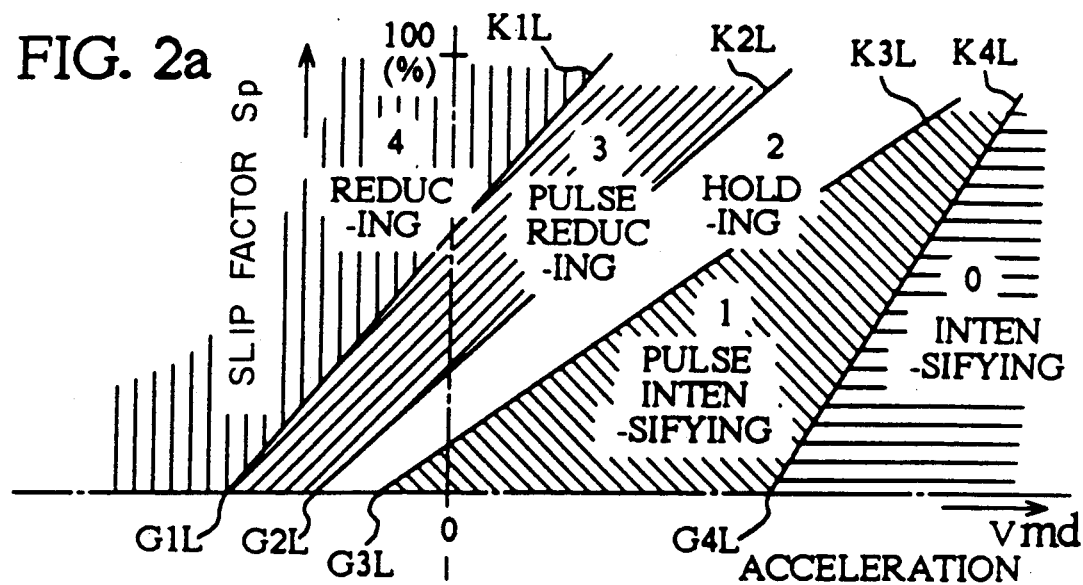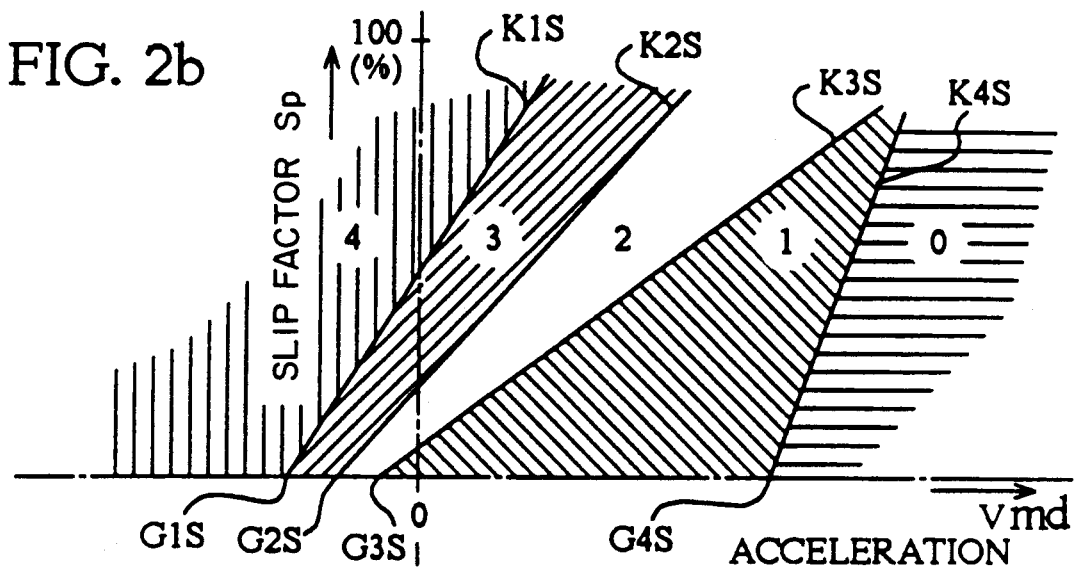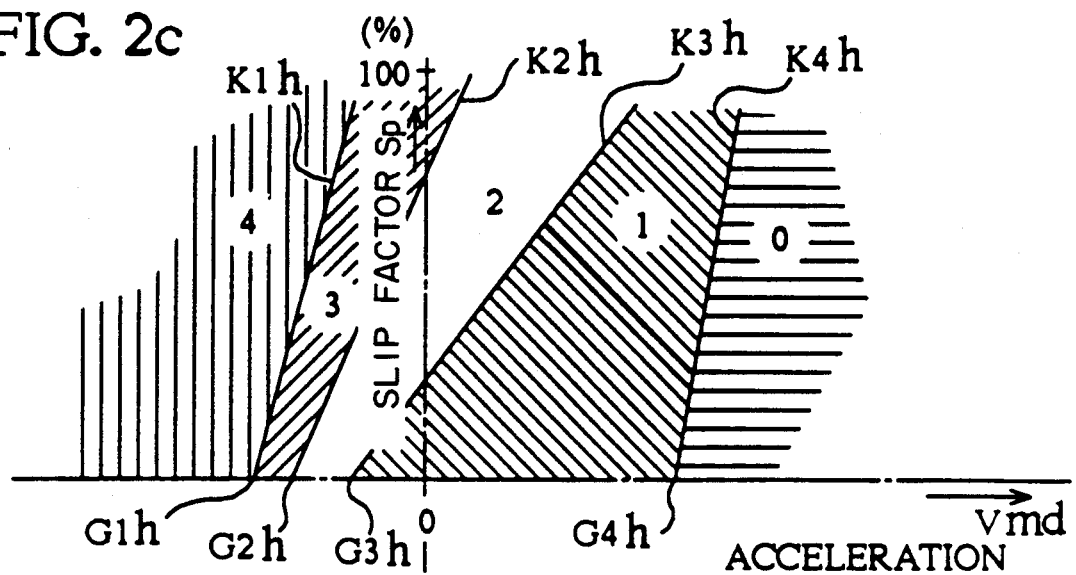

BRAKE PRESSURE CONTROL APPARATUS

This application is a continuation of application Ser. No. 07/230,228, filed Aug. 9, 1988 now abandoned.

BACKGROUND OF THE INVENTION

1. Field of the Invention

The present invention relates to a control of car power brakes and more particularly to antiskid control for decreasing wheel skidding on a road surface by damping the power of the brakes to permit acceleration of the rotation of wheels, where the wheels are decelerated abruptly by the brake power, causing heavy skidding on the road surface.

2. Description of the Prior Art

If a car is braked while running on a wet or frozen road, the wheels stop suddenly and slip on the road surface thus, the car is capable of skidding on the road surface, which may often take place when the car runs at high speed or is braked suddenly. If the wheels are locked while the car runs forward, steering gets difficult and causes car accidents.

Now, therefore, acceleration is computed by detecting wheel rotational speed, a slip factor is computed as:

Sp=1—wheel rotational speed/car speed and thus when the slip factor in the brake equals a predetermined value Sh or over, the brake pressure is stepped down to recover the wheel rotation. The car speed cannot be detected accurately when slipping. Consequently, a reference speed regarded as the car speed is obtained through various arithmetic operations according to the wheel rotational speed. In the case of four-wheel cars, for example, a top wheel speed is specified as the reference speed.

Such a type of antiskid control is disclosed, for example, in Japanese Patent Laid-Open No. 54789/1974. In the antiskid control disclosed therein, a "reducing" domain and an "intensifying" domain are so divided as shown in FIG. 6, and where the slip factor equals 20% to 60%, the wheel brake pressure is reduced at a wheel acceleration (plus indicating acceleration, and minus indicating deceleration) being less than G, and is intensified at an acceleration of G or over. When the slip factor is less than 20%, a boundary value is lowered to $G-\alpha$, and when exceeding 60%, the boundary value is raised to $G+\beta$.

For setting the wheel brake pressure, more appropriately, it is preferable that a range (0 to 100%) of the slip factor be further subdivided to specify the boundary value accurately, and for smoothing a fluctuation of the wheel brake pressure, it is preferable that the brake pressure be divided into three domains by interposing a "hold" domain between those "reducing" and "intensifying" or further divided into five domains by providing domains "slow reducing", "hold" and "slow intensifying" further to the two stages of "reducing" and "intensifying".

However, as the slip factor is subdivided, or, for example, the boundary value coordinating with the slip factor is specified analogically, the memory capacity becomes large. A boundary group increases by one at every increase in one of the domain segments, therefore according as the slip factor is subdivided, the domain segment is modified accordingly, and the boundary values increase immensely in number, and thus the memory capacity therefor becomes immensely large. Further, when the domain segment is modified to a car deceleration (3 segments) like the embodiment (FIG. 2a to FIG. 2c) of the invention which will be described hereinafter, the number of boundary values is further multiple three (segment number of the deceleration) times, and the necessary memory capacity gets immensely large, accordingly. If the required memory capacity increases, then the number of digits of the address data for memory reading is multiplied, the number of signal lines of a microcomputer system used for antiskid control increases, and the system increases in scale accordingly; and the hardware and a controlling logic becomes complicated.

SUMMARY OF THE INVENTION

A first object of the invention is to control a wheel brake pressure more appropriately and smoothly, and a second object is to decrease a memory capacity for loading a reference value for deciding or determining a brake pressure control mode.

In a first aspect, a brake pressure control mode is divided into three or more segments, including "reducing", "hold" and "intensifying"; memory means for storing a constant to specify a function indicating a boundary line for segmenting into a "reducing" domain, a "hold" domain and an "intensifying" domain is provided in a two-dimensional plane with an operation parameter determined by rotational speed of the wheel, the reference speed, and wheel rotation acceleration as a variable; a function calculated value is obtained through substituting or using one of the operation parameters corresponding to the wheel rotational speed of the wheel which is detected by a wheel speed detecting means and the reference speed computed by an arithmetic means, and the wheel rotation acceleration, and the aforementioned constant of the function, which is compared with the other to decide the "reducing", "intensifying" or "hold"; the wheel brake pressure is reduced when decided to be "reducing", increased when decided to be "intensifying", and is maintained when decided to be "hold".

In a second aspect, for further smoothing control of the brake pressure, a brake pressure control characteristic is modified in accordance with a friction factor $\mu$ of the road surface. Consequently, the constant for specifying the function is given in a plural set or multiples coordinated with the car deceleration. Then, "reducing", "hold" or "intensifying" is decided as described, by detecting the car deceleration and specifying the aforementioned constant coordinated with the car deceleration. Further, the car is provided with an acceleration sensor (G sensor), and the car deceleration may be detected thereby. However, a differential value of the reference speed is detected as deceleration in the preferred embodiment of the invention which will be described hereinafter.

Referring to an example, used for base in understanding, when a brake pressure control mode domain is specified as shown, for example, in FIG. 2a, a boundary (function) between domains (4) and (3) is a straight line $(Sp=K1_L \cdot Vmd - K1_L \cdot G1_L)$, which is specified by designating constants $K1_L$ and $G1_L$. As shown in FIG. 2a, these constants may be given in 4 sets (4 straight lines) when segmented into 5 domains. When modifying the domain segment in accordance with car deceleration, as FIG. 2a (low deceleration=low $\mu$), FIG. 2b (middle deceleration=middle $\mu$) and FIG. 2c (high deceleration=high $\mu$), the aforementioned constant may be in $4 \times 3 = 12$ sets. Accordingly, the number of constants loaded in the memory beforehand is very few.

Further, according to the invention, if a uniaxial variable is the slip factor Sp (being a function of the reference speed (car speed) and the wheel speed) as shown, for example, in FIG. 2a, then for determining whether or not, for example, the current state of wheels is "suddenly reduced (or reduced)", a value obtainable through substituting the current wheel acceleration speed Vmd:

$$Spa = K1_L \cdot Vmd - K1_L \cdot G1_L$$

for the linear equation:

$$Sp = K1_L \cdot Vmd - K1_L \cdot G1_L \quad \ldots (1)$$

is calculated and the decision is such that the state is in a domain "suddenly reduced" (so required) if the current slip factor Sp is Spa or greater. If the current slip factor SP comes less than Spa, then the state is not in the domain "suddenly reduced", and hence a decision is made next on whether or not it comes in a domain "pulse reducing (slow reducing; recurrence of reducing + hold)" by means of a linear equation:

$$Sp = K2_L \cdot Vmd - K2_L \cdot G1_L$$

If Eq. (1) is deformed as:

$$Vmd = (1/K1_L) Sp + G1_L \quad \ldots (2)$$

then $VMd = (1/K1_L) Sp + G1_L$ is calculated from substituting the current slip factor Sp for the equation, VMd is compared with the current wheel acceleration Vmd, and if Vmd is below VMd, the state is determined decided to be "suddenly reducing".

Such calculation and comparison are relatively simple. Hence, they can be performed by means of data with the slip factor Sp, and/or the wheel acceleration Vmd expressed in a high resolution (high subdivision factor) unit. That is, a similar operational result, simplified for the stage segment, and a decision result are thus obtainable. The domain is in three or more segments, and also, the wheel brake pressure can be intensified, or reduced smoothly.

Other objects and features of the present invention will become obvious from the following description of the disclosure and in the accompanying drawings.

BRIEF DESCRIPTION OF THE DRAWINGS

FIG. 1b is a block diagram showing a construction of an electronic control unit 10 of in FIG. 1a.

FIG. 2a is a graph showing a brake pressure control mode domain segment selected in accordance with wheel acceleration Vmd and a wheel slip factor Sp when a car is running on a road with a low friction factor.

FIG. 2b is a graph showing a brake pressure control mode domain segment selected in accordance with the wheel acceleration Vmd and the wheel slip factor Sp, when a car is running on a road with a medium friction factor.

FIG. 2c is a graph showing a brake pressure control mode domain segment selected correspondingly to the wheel acceleration speed Vmd and the wheel slip factor Sp when a car is running on a road with high friction factor.

DETAILED DESCRIPTION OF PREFERRED EMBODIMENT

Figure 1A:
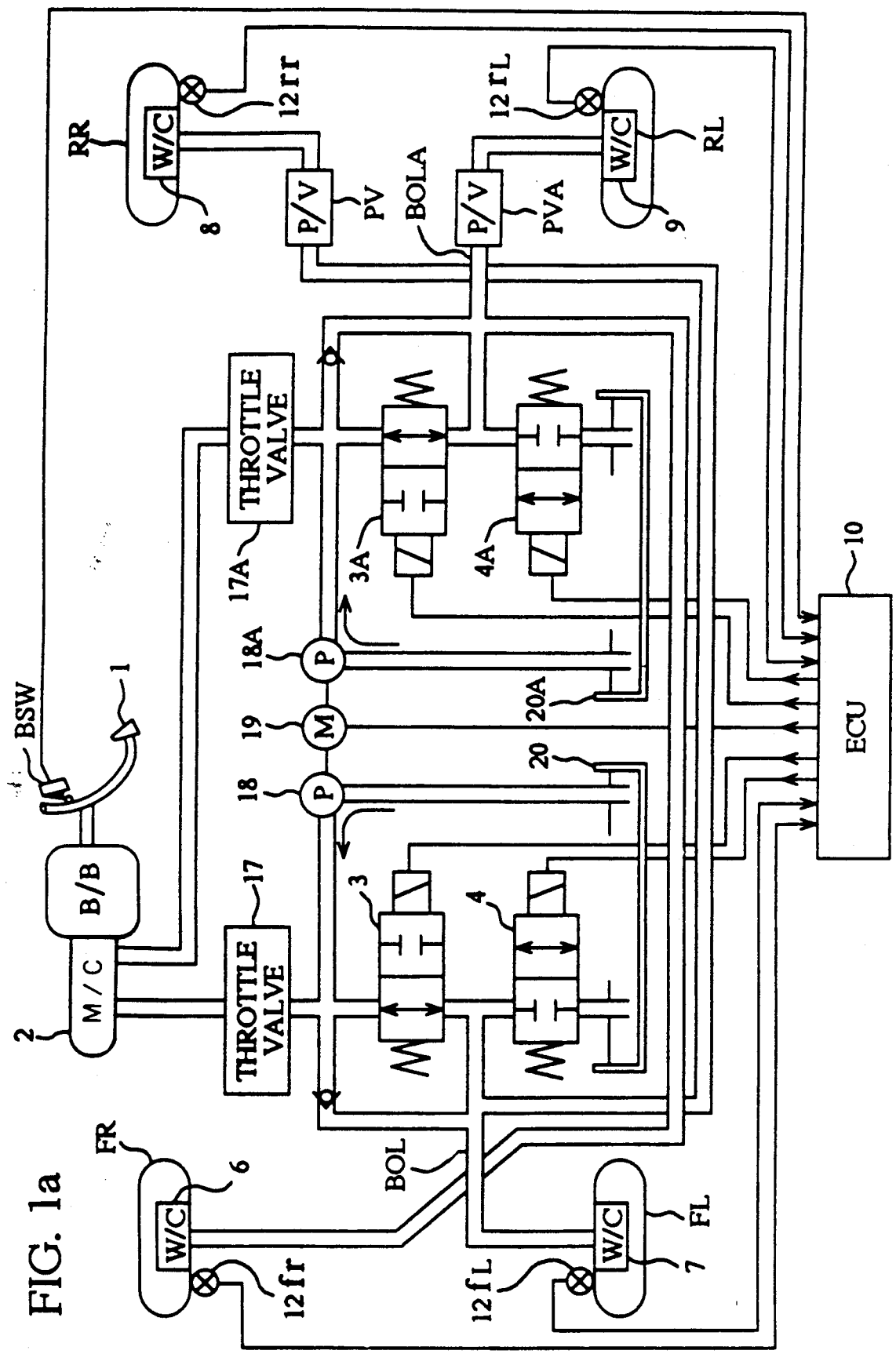
FIG. 1a is a block diagram showing a schematic construction of a brake system of one embodiment of the invention.

A system configuration of one preferred embodiment of the invention is shown in FIG. 1a. When a driver steps on a brake pedal 1, a brake pressure corresponding thereto is applied to a brake 7 of a front left wheel FL and a proportional valve PV from a brake master cylinder 2 through a throttle valve 17, and a first solenoid valve 3; and is also applied to a brake 6 of a front right wheel FR and a proportional valve PVA through a throttle valve 17A and a first solenoid valve 3A. The proportional valve PV applies a pressure proportional to the brake pressure to a brake 8 of a rear right wheel RR, and the proportional valve PVA applies a pressure proportional to the brake pressure to a brake 9 of a rear left wheel RL.

The first solenoid valves 3, 3A are normally open types, each having roughly a plunger for controlling a passage between the master cylinder 2 and the wheel brake, a compression coil spring for forcing the plunger in an open direction, and a magnetic yoke and an electric coil for driving the plunger in a closed direction against a force of the compression coil spring, and these are open (the master cylinder 2—the wheel brake communicating) when the electric coil is not conducting but closed (the master cylinder—the wheel brake interrupted) when the electric coil is conducting.

Second solenoid valves 4, 4A are interposed between the first solenoid valves 3, 3A and brake oil reservoirs 20, 20A. The second solenoid valves 4, 4A are similar to the first solenoid valves 3, 3A in construction but normally closed types, closing when the electric coil is not conducting and opening when it is conducting.

A step on the brake pedal 1 is detected by a brake detection switch BSW, and rotational speeds of the front right wheel FR, the front left wheel FL, the rear right wheel RR and the rear left wheel RL by speed sensors 12fr, 12fL, 12rr and 12rL, respectively.

Brake oil is pumped from the reservoir 20 by a pump 18, and fed to an oil passage between the first solenoid valve 3 and the throttle valve 17, and brake oil is pumped from the reservoir 20A by a pump 18A and fed to an oil passage between the first solenoid valve 3A and the throttle valve 17A. The pumps 18, 18A are driven by an electric motor 19.

The electric coils of the first and second solenoid valves 3, 3A and 4, 4A, the electric motor 19, the brake detection switch BSW, and the speed sensors 12*fr* to 12*rL* are connected to an electronic control unit 10.

Figure 1B:
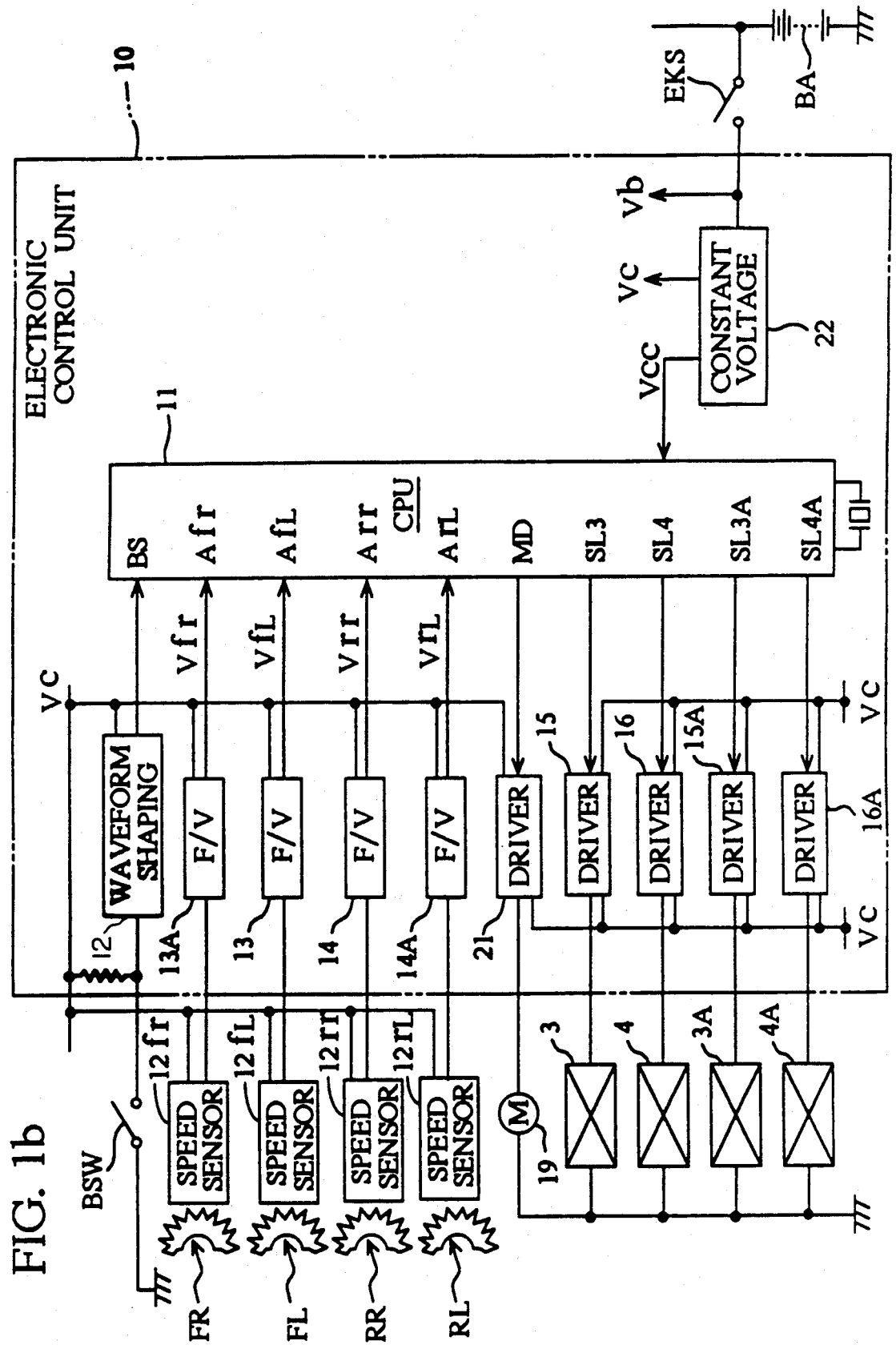

A construction of the electronic control unit 10 is shown in FIG. 1*b*. The brake detection switch BSW is connected to a waveform shaping circuit 12, and the circuit 12 provides a low level signal L to a microprocessor processor 11 when the switch BSW is closed by stepping on the brake pedal 1, and a high level signal H thereto, when the switch BSW is opened by releasing the brake pedal 1. The waveform shaping circuit 12 comprises a filter circuit and a binary circuit and prevents oscillation of output signals (L/H) due to chattering when the switch BSW is transferred from open to close condition or vice versa or reversely thereto.

The speed sensors 12*fr* to 12*rL* are hole integrated circuits (including a hole element for detecting level of a magnetic field and a binary circuit for binary-coding of a detection signal), and generate pulses of a frequency proportional to a rotational speed of a geared permanent magnet coupled to axles in response to its rotation. The pulses are provided to F/V converters 13, 13A and 14, 14A. The F/V converters 13, 13A and 14, 14A generate voltages of a level proportional to a frequency of input electrical signals, which are provided to A/D conversion input ends A$fr$ to A$r_L$ of the microprocessor 11.

A constant voltage circuit 22 is connected to a battery BA on the car through an engine key switch EKS.

Figure 4A:
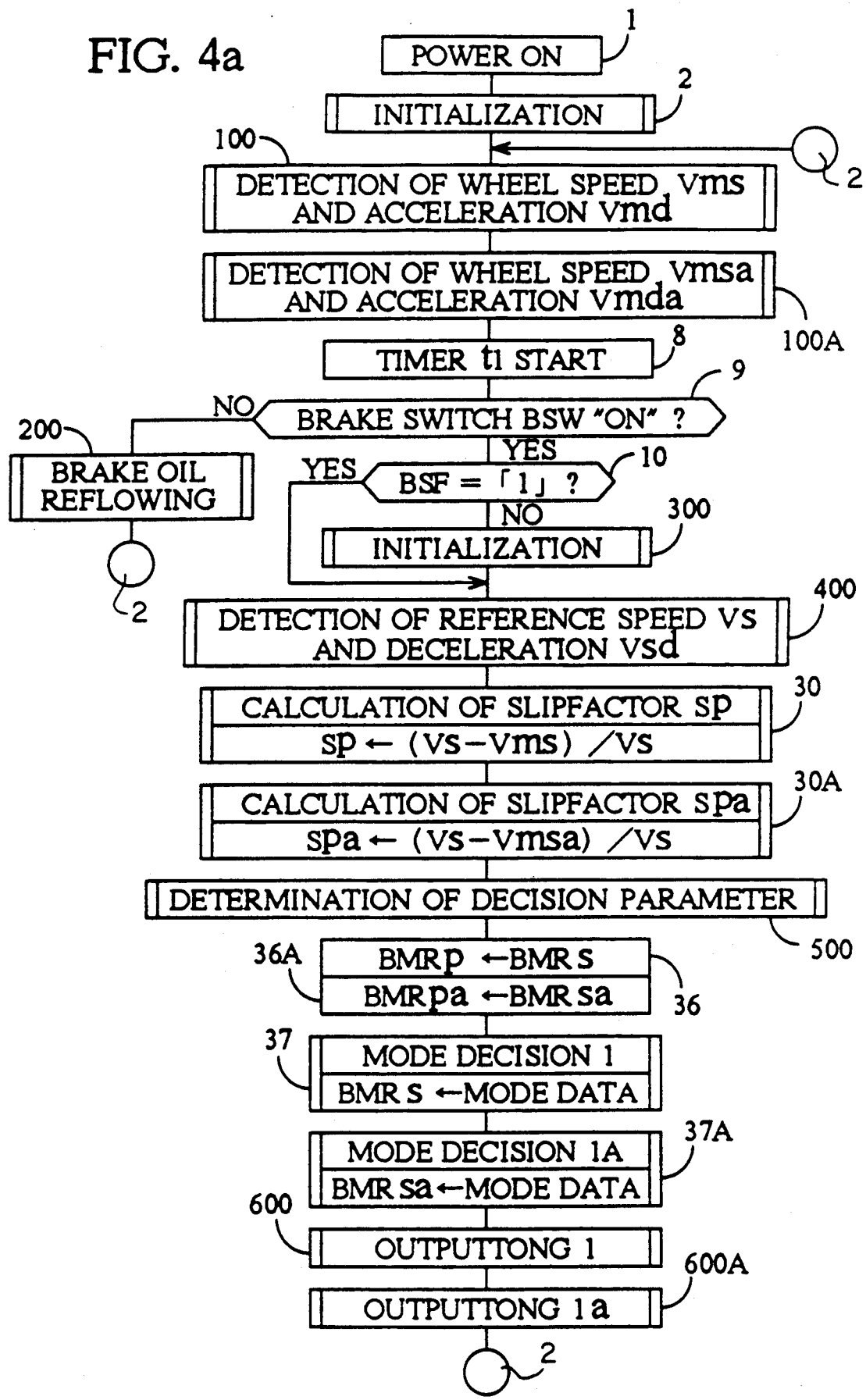
FIG. 4a, FIG. 4b, FIG. 4c, FIG. 4d, FIG. 4e, FIG. 4f, FIG. 4g, FIG. 4h, FIG. 4i, FIG. 4j and FIG. 4k are flowcharts each showing a processing operation of microprocessor 11, shown in FIG. 1b.

Brake pressure controlling operations of the microprocessor 11 are shown in FIG. 4*a* to FIG. 4*k*. With reference to FIG. 4*a*, the brake pressure controlling operations will be summarized as follows:

(1) Initialization (1, 2)

When the switch EKS is closed and the constant voltage circuit 22 generates a constant voltage Vcc of predetermined level, the microprocessor 11 is actuated (STEP 1: words such as step and subroutine being omitted by simply indicating reference symbols thereof within parentheses hereinafter) to clear internal register, counter, timer and others, and outputs (latches) L (pump stop: the electric motor 19 not conducting) to an output port MD and also L (valves 3, 3A open, valves 4, 4A close) to output ports SL3, SL4, SL3A and SL4A (2).

(2) Detection of wheel speed, acceleration and so forth (100, 100A):

First, a rotational speed Vf$_L$ of the front left wheel FL and a rotational speed Vrr of the rear right wheel RR are read by subroutine (100), an average Vms is computed, and an acceleration speed Vmd of the average speed Vms (plus being acceleration, minus being deceleration) is then computed. Digital data representing the speeds VfL, Vrr is processed so as to indicate ½ of a wheel rotation circumferential speed (equal to car speed unless wheels slip on the road surface). Accordingly the average speed Vms may be expressed as:

$$Vms = Vfl + Vrr$$

Next, rotational speed Vfr of the front right wheel FR and rotational speed VrL of the rear left wheel RL are read by subroutine (100A) as in the case of subroutine (100), an average speed Vmsa is computed, and an acceleration Vmda of the average speed Vmsa is computed.

When these operations are over, a timing t$_1$ for measuring a time interval t$_1$ used for Vmd and Vmda operations is started (clearing timed value and starting the timing) (8), and a check is made on whether the brake detection switch BSW is open (the brake pedal 1 not stepped on) or closed (the brake pedal 1 stepped on) (9). If the switch BSW is closed, then whether or not the content of a flag register BSF is "1" (already closed and thus read previously) (10). If not "1", then the situation is such that the brake detection switch BSW has been changed from "off" (the brake pedal 1 not stepped on) to "on" (stepped on), therefore the next initialization (300) is run.

(3) Initialization (300):

First, the then average speeds Vms and Vmsa are stored as initial wheel speeds Vpi, Vpi, and Vms or Vmsa whichever higher in value is regarded as the reference speed (car speed) Vs and so stored.

(4) Detection of reference speed Vs and deceleration Vsd (400)

While the switch BSW is turned on, the reference speed Vs regarded as a car speed is computed. the deceleration Vsd (plus being deceleration; minus being acceleration) is then computed, updated and so stored.

(5) Calculation of slip factor (30, 30A)

The wheel slip factor to a road surface is computed from reference speed Vs and average speed Vms by a subroutine (30):

$$Sp = (Vs - Vms)/Vs$$

and the slip factor is computed likewise by a subroutine (30A):

$$Spa = (Vs - Vmsa)Vs$$

(6) Determination of decision parameter (500)

Decision or determination is made on whether deceleration Vds of the reference speed Vs (car speed estimated value) is on a low level (road friction factor $\mu$ being small: slippery road surface), a medium level ($\mu$ being medium), or a high level ($\mu$ being high: road surface being hard to slip).

Referring to the logic for deciding the control mode to be either "reducing", "pulse reducing", "hold", "pulse intensifying" or "intensifying", any of these modes will be decided according to values of the deceleration Vds, the slip factors Sp, Spa and the wheel acceleration Vmd, Vmda. The control mode domain will be determined or decided as shown in FIG. 2*a* when the deceleration Vds is low. It will be as shown in FIG. 2*b* when the deceleration Vds is medium, and as shown in FIG. 2*c* when the deceleration Vds is high. In the drawings, a straight line (full line) of the boundary between different modes, or, for example, the straight line between "suddenly reducing" and "pulse reducing" is expressed by:

$$Sp = K1L \cdot Vmd - K1L \cdot G1L$$

$$Spa = K1L \cdot Vmds - K1L \cdot G1L$$

where K1$_L$ indicates an inclination of the straight line and G1$_L$ indicates an intersection with the axes of abscissa (Vmd, Vmda). As will be apparent from comparing FIG. 2*a* (deceleration Vds being low), FIG. 2*b* (deceleration Vds being medium) and FIG. 2*c* (deceleration Vds being high), these straight lines are shifted to a high acceleration side in a large inclination, when as the deceleration Vds is small (the road surface being slippery). As a result the brake pressure is appropriately determined to cope with the slipperiness of the road.

Upon determination of the decision parameter, mode data of mode registers BMRs, BMRsa are written in mode registers BMRp, BMRpa (36, 36A).

(7) Mode decision (37, 37A)

The inclinations (K1$_L$ and others) of straight lines and the intersections (G1$_L$ and others) with the axes of abscissa are specified in accordance with the level of deceleration Vds (one of FIG. 2a to FIG. 2c being specified).

Next, the current wheel acceleration Vmd (Vmda) is substituted for each of the straight lines of a specified straight line group (any of FIG. 2a to FIG. 2c), SPa, (SPaa), for example, are computed as:

$$SPa = K1_L \cdot Vmd - K1_L \cdot G1_L$$

$$(SPaa) = K1L \cdot Vmda - K1L \cdot G1L$$

the above are compared with the current slip factor Sp (Spa), and a decision is made as to which mode domain, namely, ④ "reducing", ③ "pulse reducing", ② "hold", ① "pulse intensifying" or ⓪ "intensifying" the current wheel acceleration Vmd (Vmda) and the current slip factor Sp (Spa) is ti come in to effect.

(8) Outputting (600, 600A)

If decided to be ④ "reducing", then the first solenoid valve 3 (3A) is closed and the second solenoid valve 4 (4A) is opened. Thus brake oil between the first solenoid valve 3 (3A) and the wheel brakes 7, 8 (6, 9) flows into the reservoir 20 (20A) through the second solenoid valve 4 (4A). Pressures on the wheel brakes 7, 8 (6, 9) drop at relatively high speed.

If decided to be ③ "pulse reducing", the mode is kept in "reducing" for the first 16 msec. and then changed to "hold" for the next 16 msec. with the first and second solenoid valves 3, 4 (3A, 4A) both close, thus repeating "reducing" and "hold". The wheel brake pressures drop at a speed lower than that of the aforementioned "reducing".

If decided to be ② "hold", the first solenoid valve 3 (3A) and the second solenoid valve 4 (4A) are closed. Thus, brake oil between the first solenoid valve 3 (3A) and the wheel brakes 7, 8 (6, 9) is shut off from the master cylinder 2 and the reservoir 20 (20A), and pressures on the wheel brakes 7, 8 (6, 9) do not change consequently.

Figure 3:
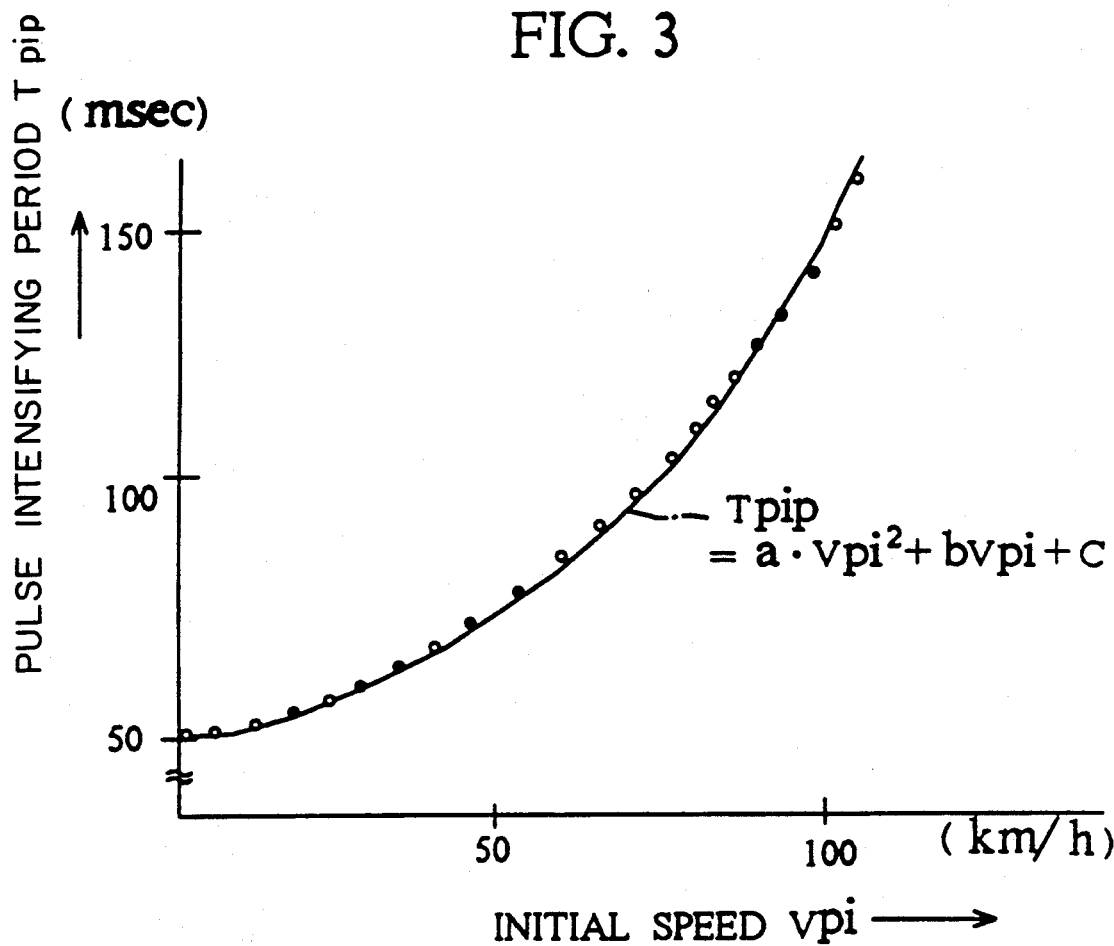
FIG. 3 is a graph showing a relation between a wheel rotational speed (initial velocity Vpi) at the point in time when a brake pedal 1 shown in FIG. 1a is depressed, and a pulse intensifying period Tpip set in accordance therewith.
Figure 6:
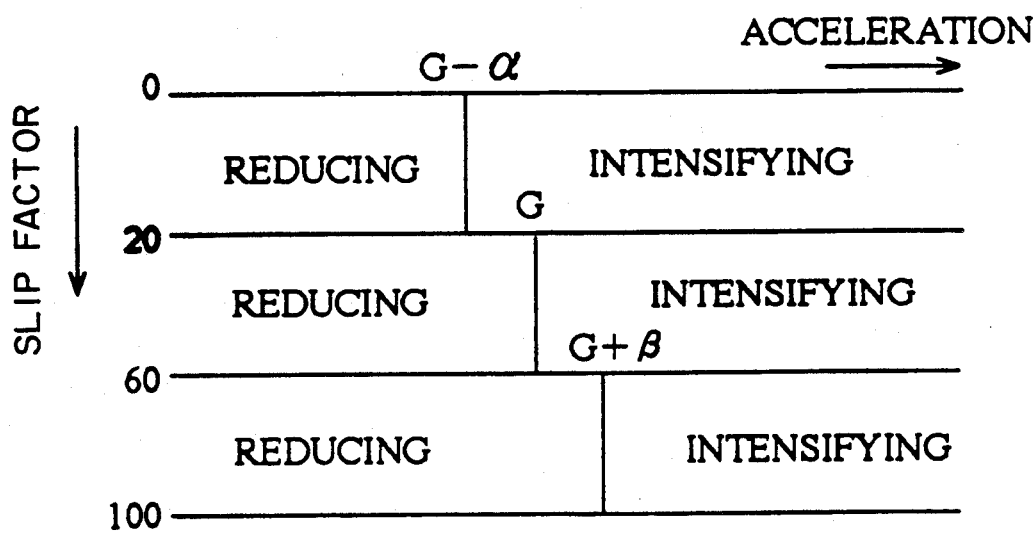
FIG. 6 is a graph showing a conventional brake pressure control mode segment.

If decided to be ① "pulse intensifying", a pulse period is computed by means of the initial speed Vpi (Vpia) (FIG. 3) as:

$$Tpip = a \cdot Vpi^2 + b \cdot Vpi + c \; j$$

$$(Tpipa = a \cdot Vpia^2 + b \cdot Vpia + c)$$

the mode is kept in "intensifying" for the first 6 msec. with the first solenoid valve 3,(3A) open and the second solenoid valve 4 (4A) closed and then changed to the aforementioned "hold" for the next (Tpip−6)msec. {(Tpipa−6)msec.≡, thus repeating "intensifying" and "hold". Thus, pressures on the wheel brakes rise at relatively low speed.

If decided to be ⓪ "intensifying", then the first solenoid valve 3 (3A) is opened and the second solenoid valve 4 (4A) is closed. Thus, pressures on the wheel brakes rise at relatively high speed.

Then, in the case of ⓪ "intensifying", a pulse period is computed by means of the initial speed Vpi (Vpia) (FIG. 3) as:

$$Tpip = a \cdot Vpi^2 + b \cdot Vpi + c$$

$$(Tpipa = a \cdot Vpia^2 + b \cdot VPia + c)$$

and the timer Tpip (Tpipa) is started. The above operation is to keep an interval (period) between the anteceding "intensifying" and the later "intensifying" at Tpip (Tpipa) when ⓪ "intensifying" is intermittent, or changed to ① "pulse intensifying".

(9) Brake oil reflowing (200)

When the brake detection switch BSW is changed from ON (pedal stepped on) to OFF (pedal released) (braking being unnecessary), the first solenoid valves 3, 3A are opened, the second solenoid valves 4, 4A are also opened, the electric motor 19 is stopped, and a predetermined time t$_0$ later, the second solenoid valves 4, 4A are reclosed. Thus, pressures on the wheel brakes return to the reservoir (low pressure) from the throttle valves 17, 17A and also return to the master cylinder 2 on a suction of the master cylinder 2. After a lapse of the time t$_0$, pressures on the wheel brakes become a reservoir pressure (predetermined low pressure) from the throttle valves 17, 17A, the first solenoid valves 3, 3A are reopened, and the second solenoid valves 4, 4A are reclosed (as shown in FIG. 1a).

Then, when the switch BSW is again closed (the pedal 1 stepped on) during the period of time t$_0$, the second solenoid valves 4, 4A are reclosed by the subroutine (300).

Next, contents of various subroutines will be described in detail.

Here, a relation between data (loaded) given in flowcharts of FIG. 4a to FIG. 4k and a register (loading) is summarized in the following TABLE 1 to TABLE 4.

TABLE 1

| Register | | |
|---|---|---|
| Symbol | Name | Data loaded |
| BSF | Brake flag register | "1": Pedal 1 stepped on |
| | | "0": Pedal 1 not stepped on |
| Vrr | Rear right wheel speed register | Data Vrr indicating ½ of rear right wheel circumferential speed |
| VrL | Rear left wheel speed register | Data VrL indicating ½ of rear left wheel circumferential speed |
| Vfr | Front right wheel speed register | Data Vfr indicating ½ of front right wheel circumferential speed |
| VfL | Front left wheel | Data VfL Indicating ½ of front left wheel circum- |

TABLE 1-continued

| Symbol | Register Name | Data loaded |
|---|---|---|
| | speed register | ferential speed |

TABLE 2

| Symbol | Register Name | Data loaded |
|---|---|---|
| Vmp | Last time average wheel speed register | Wheel average speed computed last time: Vmp |
| Vmpa | Last time average wheel speed register | Wheel average speed computed last time: Vmpa |
| Vms | Average wheel speed register | Wheel average speed computed lately: Vms = Vrr + VfL |
| Vmsa | Average wheel speed register | Wheel average speed computed lately: Vmsa = VrL + Vfr |
| $t_1$ | Timing register | Lapse of time $t_1$ from last time wheel average speed computation to late wheel average speed computation |
| Vmd | Acceleration register | Acceleration speed Vmd of wheel average speed Vms |
| Vmda | Acceleration register | Acceleration speed Vmda of wheel average speed Vmsa |
| $t_0$ F | Lapse flag register | "1": After lapse of time $t_0$<br>"0": Before lapse of time $t_0$ |
| Vs | Reference speed register | Reference speed data: Vs |

TABLE 3

| Symbol | Register Name | Data loaded |
|---|---|---|
| Vpi | Initial speed register | Average wheel speed when pedal 1 is stepped on: Vms |
| Vpia | Inital speed register | Average wheel speed when pedal 1 is stepped on: Vmsa |
| $T_0$ | Timing register | Lapse of time $T_0$ in which Vrr, VrL, Vfr and VfL are lower than reference speed Vs |
| $T_1$ | Timing register | Lapse of time from computation of last time deceleration Vsd to next computation |
| Vi | Computed value register | Computed value obtained through decreasing reference speed Vs by predetermined decelerations: $K_1 = 1.3$ G and $K_2 = 0.15$ G |
| Vsp | Last time reference speed register | Last time reference speed: Vsp |
| Vsd | Deceleration register | Deceleration of reference speed (estimated car speed): Vsd |
| Sp | Slip factor register | Slip factor Sp computed by Vms |
| Spa | Slip factor register | Slip factor Spa computed by Vmsa |

TABLE 4

| Symbol | Register Name | Data loaded |
|---|---|---|
| G1–G4 | Constant register | Constants G1 to G4 for mode decision |
| K1–K4 | Coefficient register | Coefficients K1 to K4 for mode decision |
| BMRp | Last time mode register | Mode BMRp decided last time |
| BMRpa | Last time mode register | Mode BMRpa decided last time |
| BMRs | Mode register | Mode BMRs decided lately |
| BMRsa | Mode register | Mode BMRsa decided lately |
| Tpip | Intensifying period register | Intensifying period Tpip |
| Tpipa | Intensifying period Register | Intensifying period Tpipa |
| SPa | Operation data register | Data SPa computed according to constants G1 to G4 and coefficients K1 to K4 |
| SPaa | Operation data register | Data SPaa computed according to constants G1 to G4 and coefficients K1 to K4 |
| BDS | Reducing flag register | "1": Reducing already carried out<br>"0": Reducing not yet carried out |
| BIS | Intensifying flag register | "1": Intensifying after reducing already carried out<br>"0": Intensifying after reducing not yet carried out |

Figure 4B:
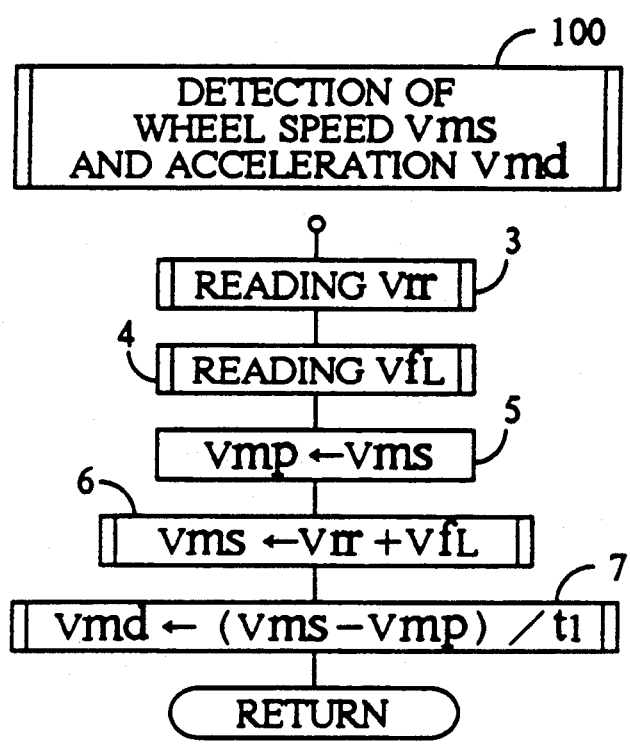

Contents of "detection of wheel speed Vsm and acceleration Vmd (100)" are shown in FIG. 4b.

In the subroutine (100) the microprocessor 11 reads a circumferential speed (½) Vrr of the front right wheel RR at a subroutine (3) therein. An analog voltage of an A/D conversion input port Arr is converted into digital one, and the digital data is written in the register Vrr (internal RAM of the processor 11). Next, a circumferential speed ($\frac{1}{2}$) VfL of the front left wheel FL is read likewise at a subroutine (4). THen in a step (5), a data Vms of the mean value register Vms is written in mean value register Vmp, the mean value Vms=Vrr+Vf$_L$ is computed, which is written in the mean value register Vms (6). Then in a subroutine (7), an acceleration of the average speed is computed as:

$$Vmd = (Vms - Vmp)/t_1$$

and written in the acceleration speed register Vmd. Then, $t_1$ represents a lapse of time from obtaining the mean value data written in the register Vmp (last time speed reading) to obtaining the mean value data written in the register Vms (next speed reading). The time $t_1$ is a timing value having started in a step (8) (FIG. 4a) after the previous operation.

An average speed Vmsa of speed Vfr of the front right wheel FR and speed Vr$_L$ of the rear left wheel RL and an acceleration speed Vmda thereof are computed in a subroutine (100A) as in the case of (100).

"Initialization (300)" will be described in detail with reference to FIG. 4d. When a driver steps on the brake pedal, the switch BSW is closed, and upon detection of the pedal 1 being stepped on the microprocessor 11 writes "0" in the lapse flag register t$_0$F (12) with the first solenoid valves 3, 3A open and the second solenoid valves 4, 4A close (11). writes "1" in the brake flag register BSF (13), writes a content Vms of the average speed register Vms in the initial value register Vpi (14a), and writes a content Vmsa of the average speed register Vmsa in the initial value register Vpia (14b). Then, Vms or Vmsa whichever is decided to be higher is written in the reference speed register Vs (14c, 14d, 14e).

Then timings $T_0$ and $T_1$ are started (15, 16), and a content Vs of the reference speed register Vs is written in the last time reference speed register Vsp (17).

The above-described steps 11 to 17 refer to initialization for the antiskid control in response to stepping on the pedal 1.

Contents of "detection of reference speed Vs and deceleration Vsd (400)" will be described in detail with reference to FIG. 4e.

Figure 5A:
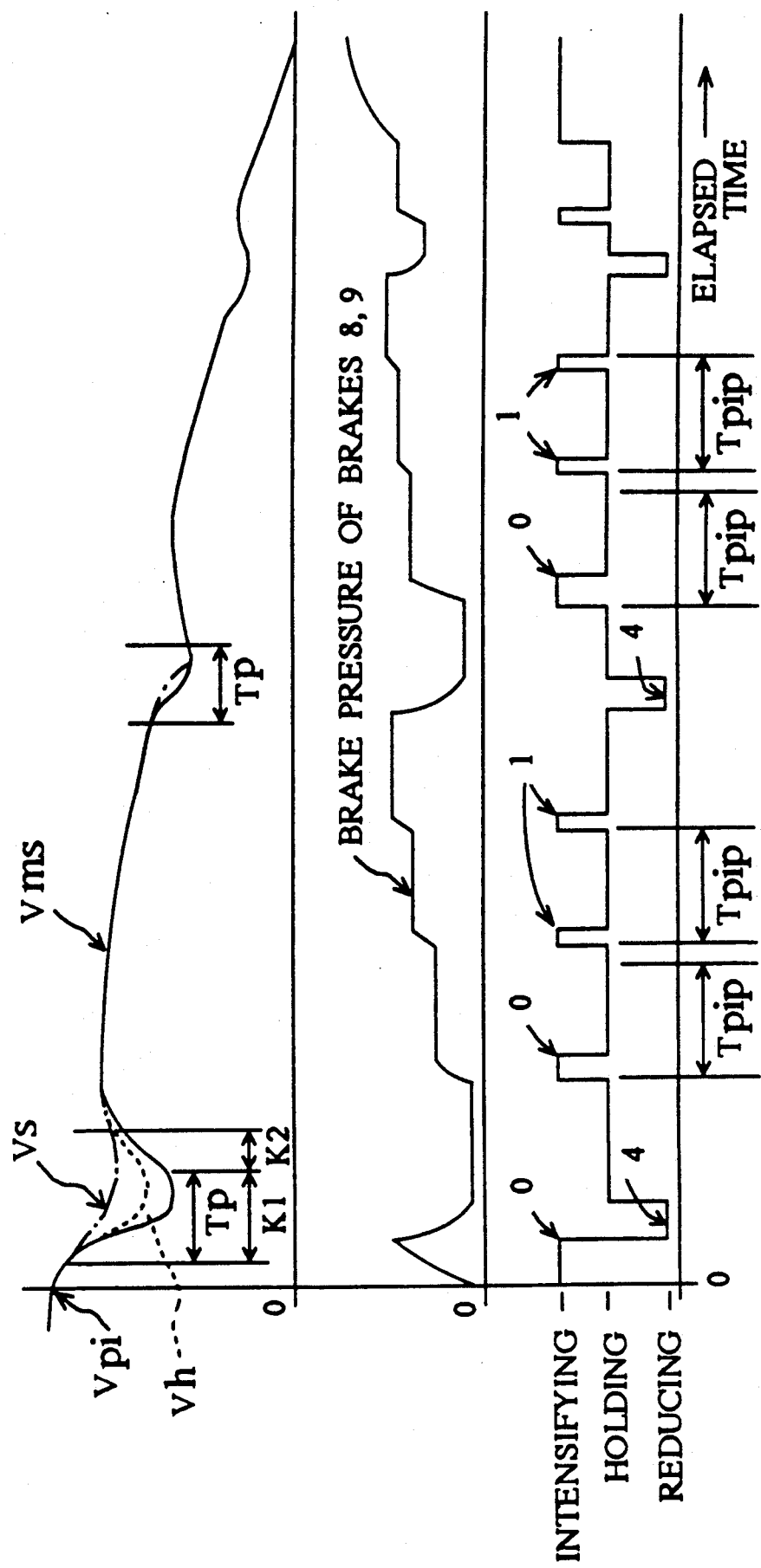
FIG. 5a is a time chart showing a relation between wheel rotational speed Vms, reference speed Vs, brake pressure control mode and wheel brake pressure in an antiskid control, starting from a high wheel speed brought by an operation of the microprocessor 11.
Figure 5B:
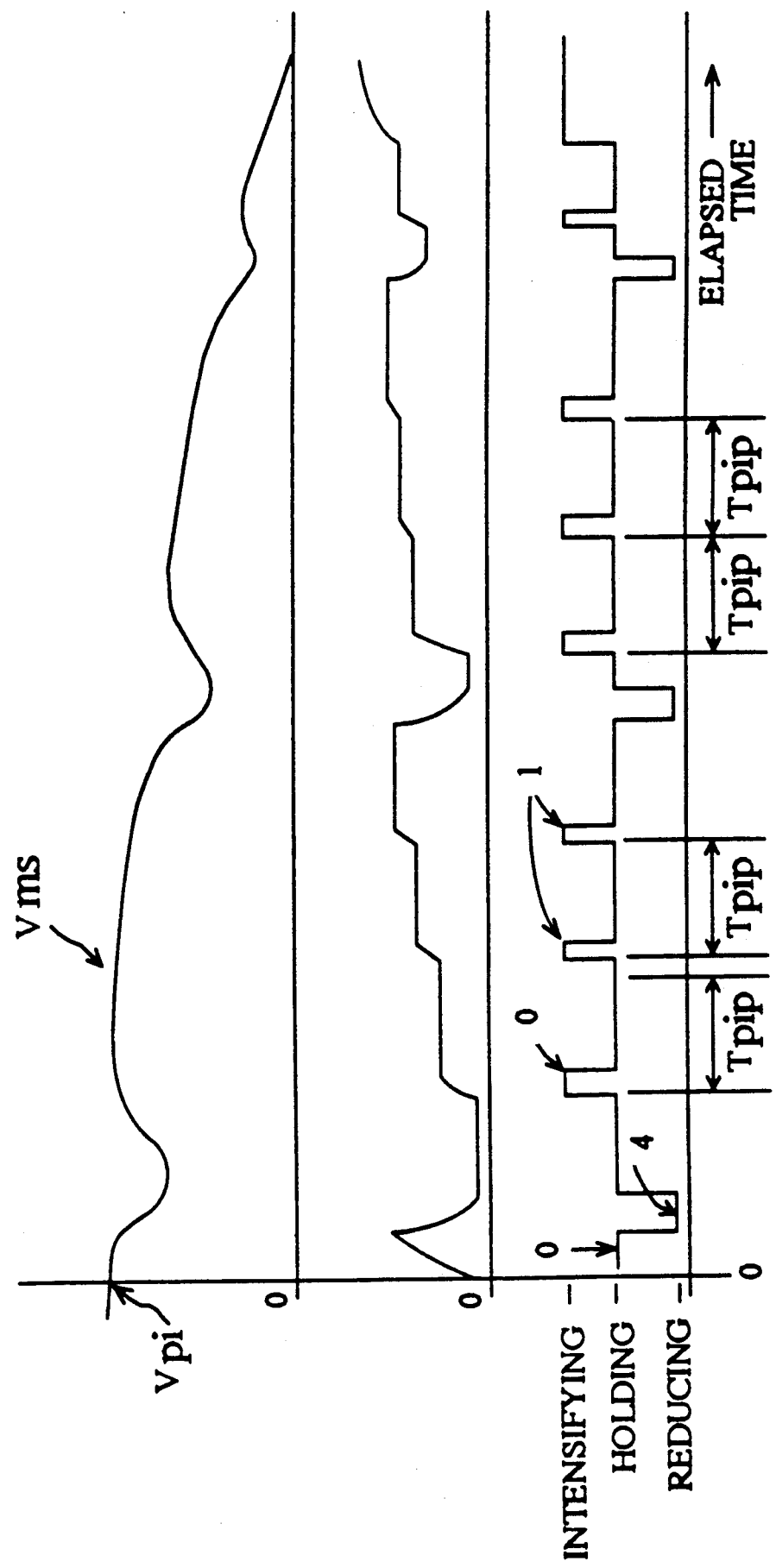
FIG. 5b is a time chart showing a relation between wheel rotational speed Vms, brake pressure control mode and wheel brake pressure in an antiskid control starting from a low wheel speed brought by an operation of the microprocessor 11.

With reference to FIG. 5a, the reference speed Vs updates (so writes in the reference speed register) a value Vi obtained through lowering Vs (Vs=Vms or Vmsa immediately after stepping on the pedal 1) written in the reference speed register Vs by Ki (=1.3 G or 0.15 G), or Vh highest one of wheel speeds Vrr, Vr$_L$, Vfr and Vf$_L$, whichever higher as the next reference speed Vs. Then, the timing $T_0$ is started from the point in time when all of the wheel speeds Vrr and others get lower than the reference speed Vs (content of the reference speed register Vs), Ki=K$_1$=1.3 G while the timing t$_0$ is a predetermined value Tp or below, but Ki=K$_2$=0.15 G when it exceeds Tp. That of Vs indicated by one-dot chain line in FIG. 5a denotes the reference speed Vs computed and lowered by the deceleration Ki. The processing will be described next.

A timing value $T_0$ of the timing register $T_0$ is compared with a set point Tp (18), and if $T_0$ is Tp or below, then:

$$Vi = Va - K_1 \cdot T_0$$

is written in the computed value register Vi (20). $K_1 = 1.3$ G in this case. When $T_0$ exceeds Tp:

$$Vi = Vs31 \; K_2 \cdot T_0$$

is written in the computed value register Vi. $K_2 = 0.15$ G.

Next, the highest one of Vrr, VrL, Vfr and VfL is written in the register Vh (21, 22, 401 to 404). A content Vi of the computed value register Vi and a content Vh of the register Vh are compared with each other and written in the reference speed register Vs whichever higher (24 to 27). Then, when Vh (wheel speed) exceeds Vi (value obtained through computing on deceleration Ki), a content of the timing register $T_0$ is cleared, and timing is recommenced from 0 (25). The above description refers to an updating of the reference speed Vs. The reference speed Vs immediately before the updating is loaded in the last time reference speed register Vsp (17).

Next a deceleration of the reference speed Vs (estimated car speed):

$$Vsd = (Vsp - Vs)/T_1$$

is computed (28). That of $T_1$ is a timing value of the timing register T:, which is a time from computation of the last time reference speed Vsp to a computation of the reference speed Vs this time. For timing to a computation of the next reference speed, a content of the timing register $T_1$ is cleared, and then the timing is recommenced (29). The above refers to a computation of the deceleration Vsd of the reference speed Vs. The deceleration Vsd is proportional to a friction factor $\mu$ of the road surface.

Referring to a content of "calculation of Sp (30)" shown in FIG. 4a, a slip factor Sp is computed (30) as:

$$Sp = (Vs - Vms)/Vs$$

Since the value is 1 or below, a data indicating integral value is obtained through multiplying it by a predetermined number (100 for example). In the above equation, Vs represents a content of the reference speed register Vs, and Vms represents a content of the average wheel speed Vms.

A calculation of Spa of a subroutine (30A) is performed as in the case of subroutine (30).

A content of "determination of decision parameter (500)" will be described in detail with reference to FIG. 4.

The deceleration Vsd is compared with predetermined values Vsd$_L$ and Vsdh (Vsd$_L$<Vsdh) (31, 32). When Vsd≦Vsdr, G1$_L$ to G4$_L$ are written in the constant registers G1 to G4 respectively, and K1$_L$ to K4$_L$ are written in the coefficient registers K1 to K4 respectively (33). G1$_L$ to G4$_L$ and K1$_L$ to K4$_L$ are fixed values, G1$_L$ to G4$_L$ being constants representing positions whereat straight lines intersect with an axis of abscissa, and K1$_L$ to K4$_L$ being coefficients representing inclinations of the straight lines shown in FIG. 2a.

When VsdL<Vsd≦Vsdh, G1s to G4s are written in the constant registers G1 to G4 respectively, and K1s to K4s are written in the coefficient registers K1 to K4 respectively (34). G1s to G4s and K1s to K4s are fixed values, G1s to G4s being constants representing positions whereat straight lines intersect with an axis of abscissa, and K1s to K4s being coefficients representing inclinations of the straight lines shown in FIG. 2b.

When Vsdh≦Vsd, G1h to G4h are written in the constant registers G1 to G4 respectively, and K1h to K4h are written in the coefficient registers K1 to K4 respectively (35). G1h to G4h and K1h to K4h are fixed values, G1h to G4h being constants representing positions whereat straight lines intersect with an axis of abscissa, and K1h to K4h being coefficients representing inclinations of the straight lines shown in FIG. 2c.

Thus, constants and coefficients indicating straight lines for segmenting mode domains are determined correspondingly to the deceleration Vsd (deceleration of the estimated car speed: proportional to the friction factor $\mu$ of the road surface).

A content of "mode decision 1 (37)" will be described in detail with reference to FIG. 4g.

As shown in FIG. 2a to FIG. 2c, which domain control mode to take depends on the straight line equation (loaded on a program (ROM) of the microprocessor 11), the wheel acceleration speed Vmd (loaded in the acceleration speed register Vmd) and the slip factor Sp (loaded in the slip factor register Sp). In the "mode decision 1" (37), which domain includes the current Vmd, Sp is decided according to the data, and data indicating the domain (control mode data) is written in the mode register BMRs.

First, "4" indicating "suddenly reducing" (same as "reducing") is written in the mode register BMRs (371). Then, the content Vmd of the acceleration speed register Vmd is substituted for an axis of abscissa parameter x of a straight line equation for specifying the boundary between a suddenly reducing domain ④ and a pulse reducing (same as slow reducing) domain ③:

$$Y = K1 \cdot x - K1 \cdot G1$$

a content of coefficient register K1 is substituted for the coefficient K1, a content of constant register G1 is substituted for the constant G1, and thus a value of axis of ordinate Y (value Y on the straight line) SPa is calculated. That is, SPa=K·Vmd·K1. G1 is computed and written in the operation data register SPa (372). If the content Sp of the slip factor register Sp is equal to SPa or above, then the necessary control mode is "suddenly reducing" ④. Now, therefore, Sp and SPa are compared with each other (373). If Sp≧SPa, then the mode is "suddenly reducing" ④, and since "4" indicating the aforementioned mode is loaded in the mode register BMRs, the process returns to main routine (to STEP 38 of FIG. 4c).

If Sp is not ≧Spa, then the mode is not "suddenly reducing" ④, and hence "3" indicating "pulse reducing" next is written in the mode register BMRs (374). Then, the content Vmd of the acceleration speed register Vmd is substituted for the axis of abscissa parameter x of a straight line equation for specifying the boundary between the pulse reducing domain ③ a hold domain ②:

$$Y = K2 \cdot x - K2 \cdot G2$$

and thus the value of axis of ordinate Y (value Y on the straight line) Spa is calculated. That is, SPa =K2·Vmd·K2·G2 is computed and written in the operation data register SPa (375). If the content Sp of the slip factor register Sp is equal to SPa or greater, then the necessary control mode is "pulse reducing" ③. Therefore, Sp and SPa are compared with each other (376). If Sp≧SPa, the mode is "pulse reducing" ③, and since "3" indicating the aforementioned mode is loaded in the mode register BMRs, the process returns here to main subroutine.

If Sp is not ≧SPa, then whether or not "hold" domain ② is decided as in the case of deciding the domain "suddenly reducing" ④ or "pulse reducing" ③ as described, and if not "hold" domain ②, whether or not "pulse intensifying" domain ① is decided. Still, if not "pulse intensifying" domain ①, then the mode is decided to be "suddenly intensifying" (same as "intensifying") domain ⓪.

As described, a data indicating the brake pressure control mode which must be effected currently is written in the mode register BMRs, and a brake pressure control mode currently effected is written in the last time mode register BMRp.

"Mode decision 1A" (antiskid control mode decision on wheels FR and RL) of a subroutine (37a) is also similar to (antiskid control mode decision on wheels FL and RR) the subroutine (37), and thus a mode having been decided this time is written in the mode register BMRsa. A brake pressure control mode run currently is written in the mode register BMRpa.

A content of "outputting 1" (600) will be described in detail with reference to FIG. 4h to FIG. 4k.

Figure 4C:
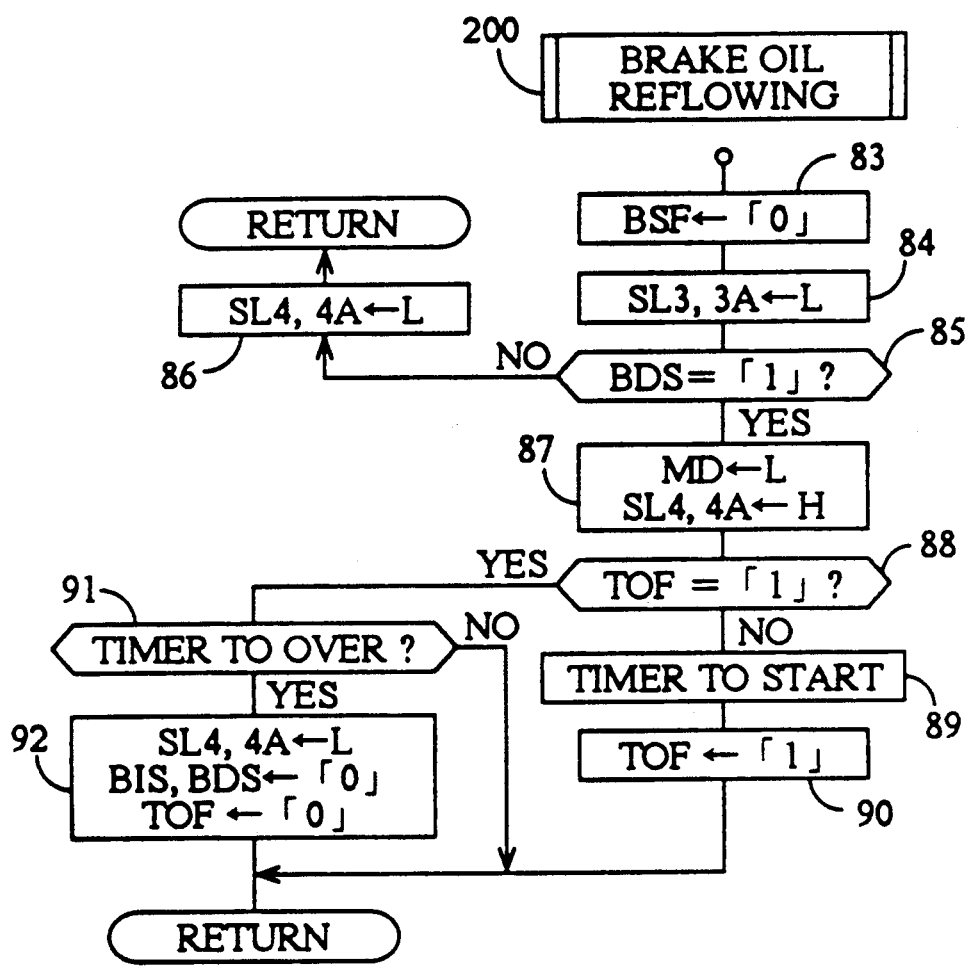
Figure 4D:
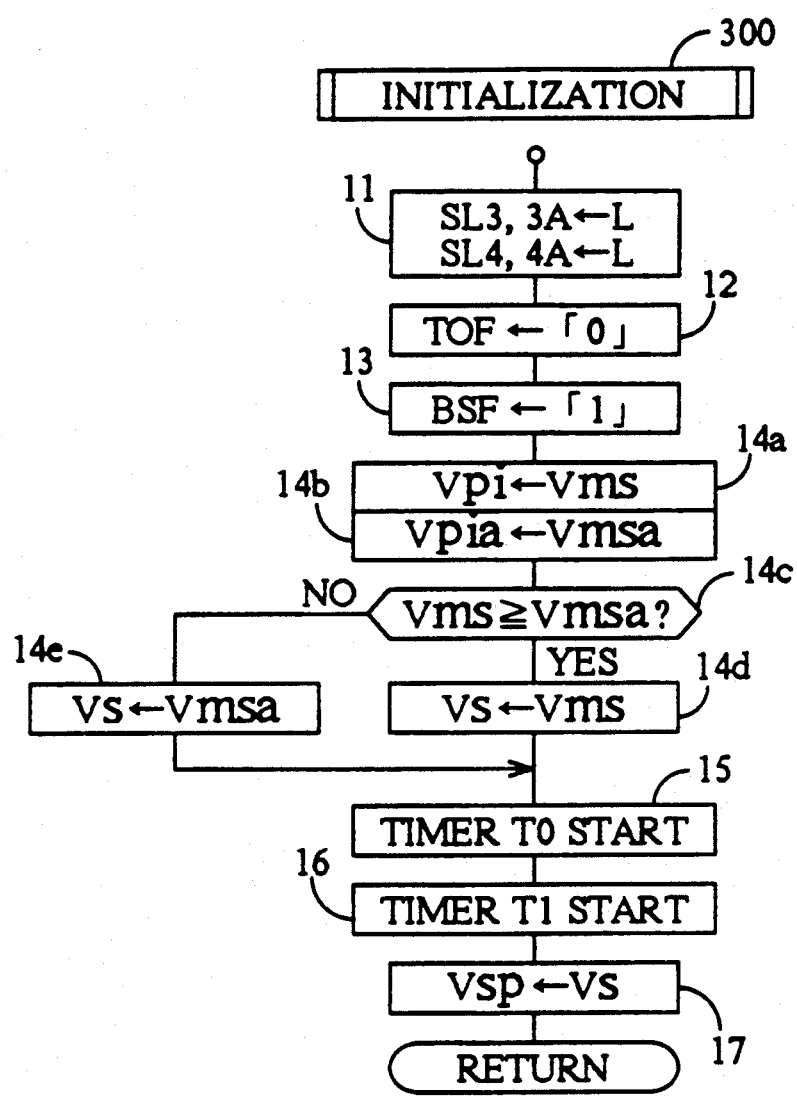
Figure 4E:
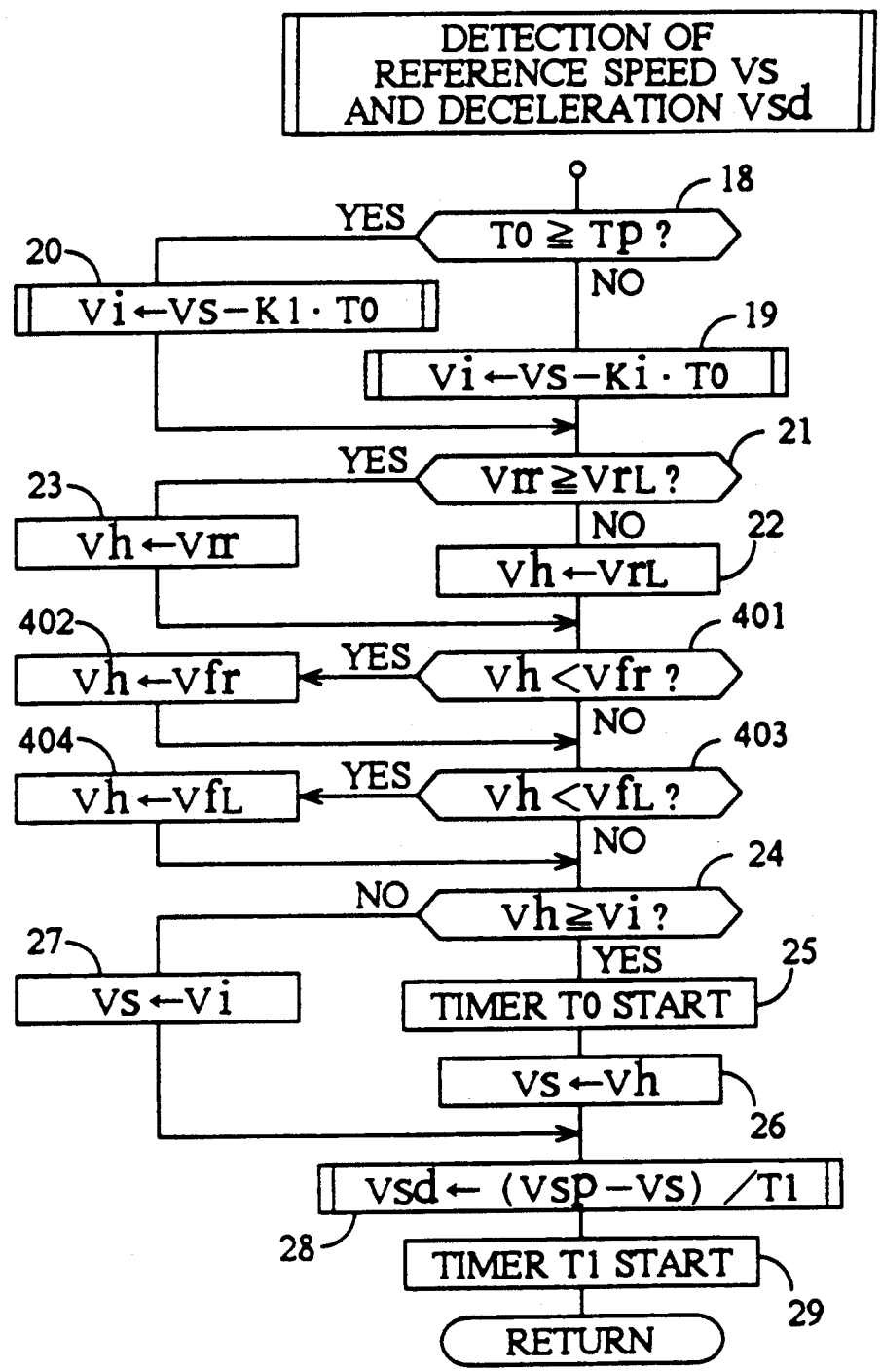
Figure 4F:
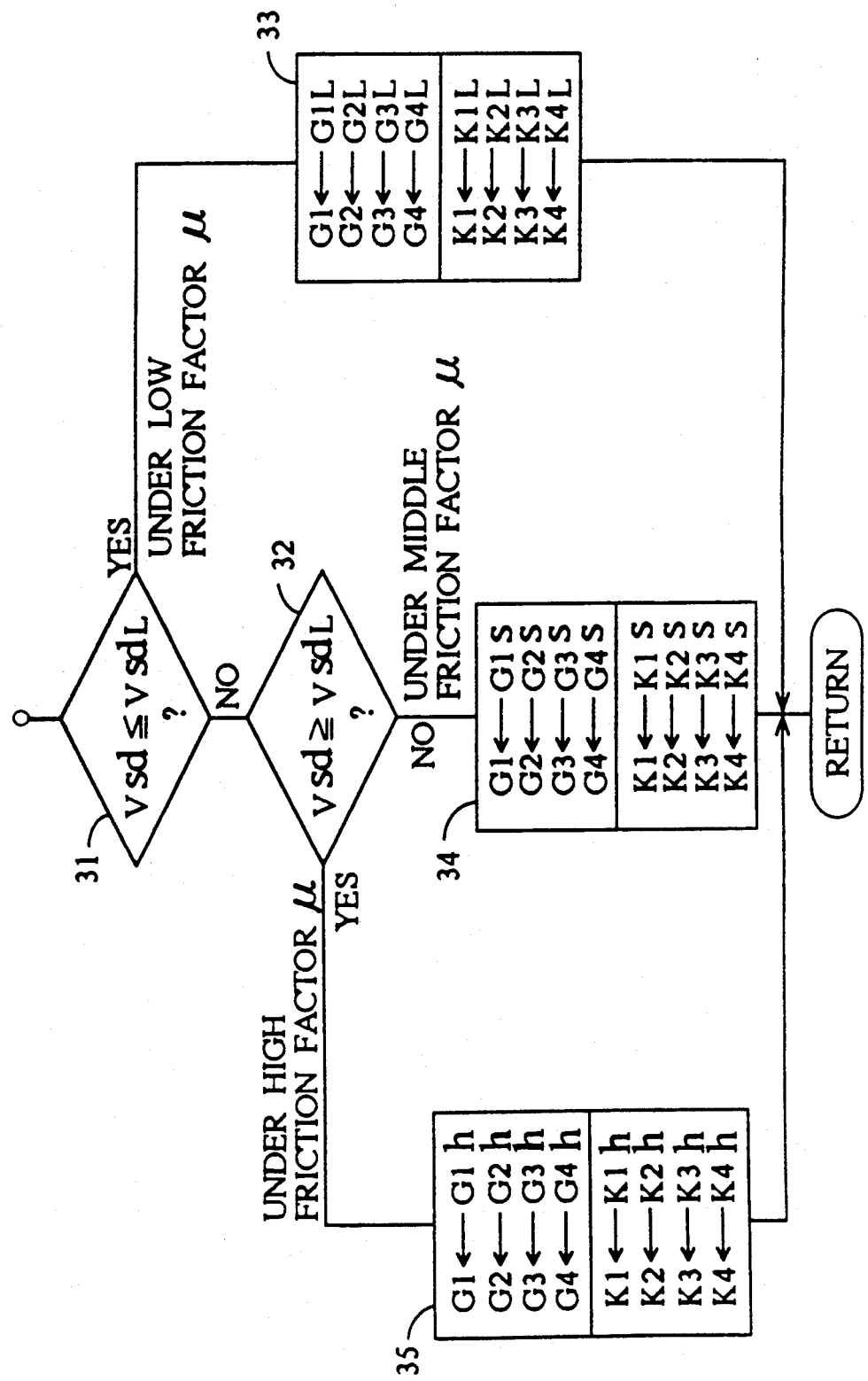
Figure 4G:
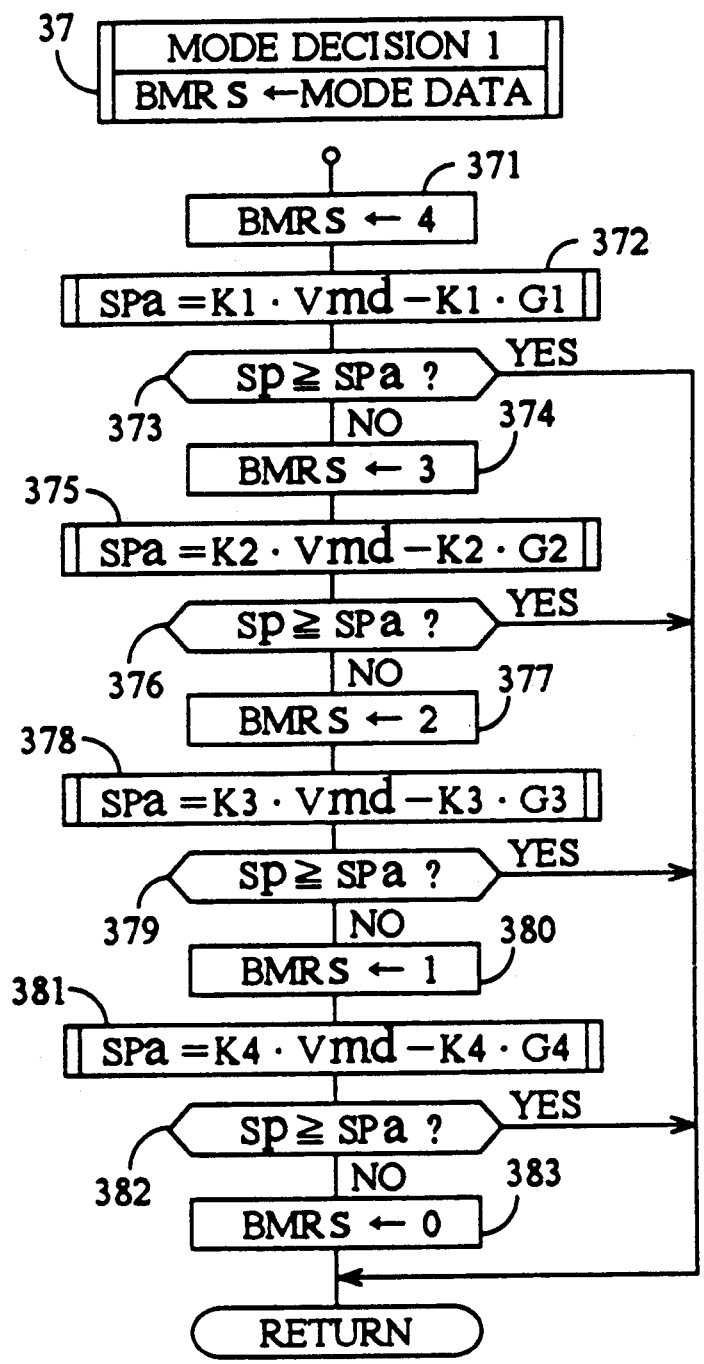
Figure 4H:
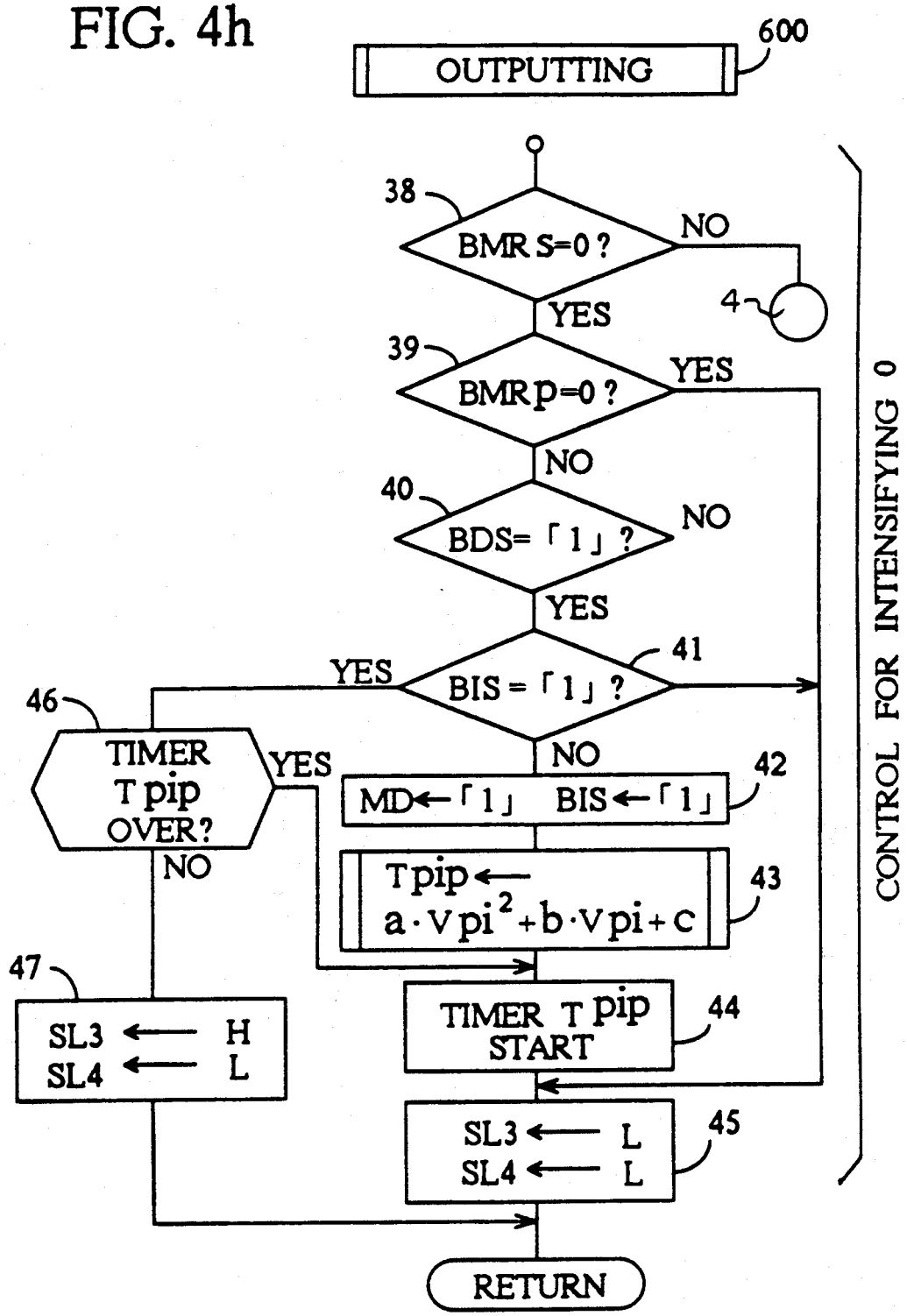
Figure 4I:
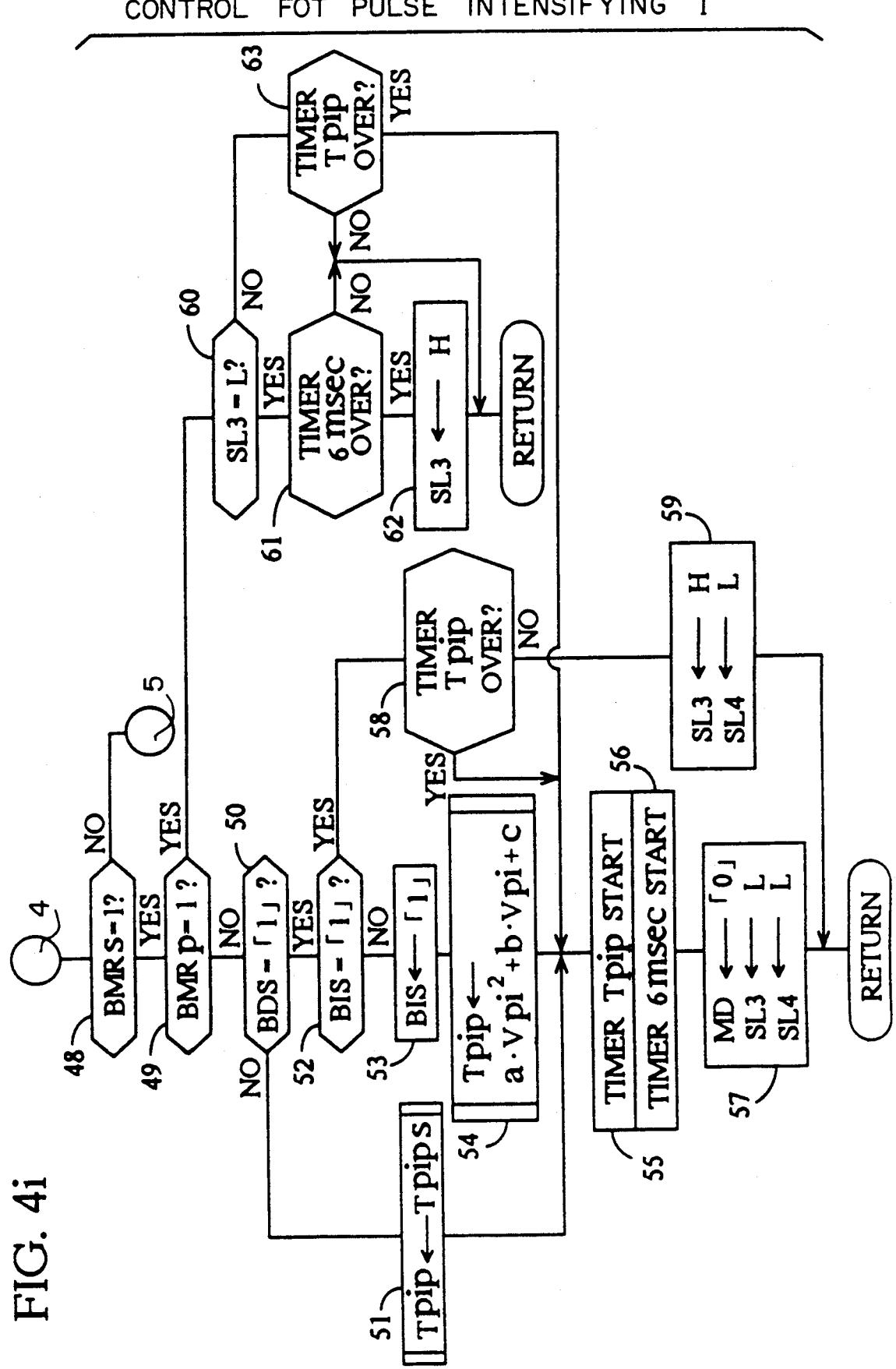

(0) "Suddenly intensifying (0) control" (FIG. 4h)

If the data written in the mode register BMRs indicates "suddenly intensifying" (0), the process goes forward from step (38) to (39), and whether or not the content of the last time mode register BMRp also indicates "suddenly intensifying" (0) is checked. If not (another mode previously), then a content of the reducing flag register BDS is checked (40). If the content of BDS is "0", the situation is such that "reducing" (suddenly reducing and pulse reducing) has never been done (an accumulator 5 containing no brake oil: normal brake action requiring no antiskid control) during the process from detection of stepping on the pedal 1 (9), therefore operation will be made as SL3=L (the first solenoid valve 3 being open), SL4=L (the second solenoid valve 4 being close) (as shown in FIG. 1a) (45). Then the process returns to main routine (to the next outputting 14).

If the content of BDS is "1", then the situation is such that "reducing" has been effected (the accumulator 5 containing brake oil: brake oil capable of increasing into the accumulator 5 from recurrence of "intensifying" and "reducing" thereafter) during the process from detection of stepping on the pedal 1 (9). A content of the intensifying flag register BIS will be checked consequently (41). If the content of the intensifying flag register BIS is "0", then the situation indicates that "reducing" (suddenly reducing or pulse reducing) was effected after the brake pedal 1 was stepped on, and "intensifying" (suddenly intensifying or pulse intensifying) has not been effected thereafter. Now, therefore, the electric motor 19 (pumps 18, 18A) is driven (outputting "1" to MD), and since the "intensifying" this time is first one after "reducing", "1" is written in the intensifying flag register BIS (42). Then, an intensifying period:

$$Tpip = a \cdot Vpi^2 + b \cdot Vpi + C$$

is computed and written in an intensifying register Tpip (43). The higher an initial speed Vpip is, the larger the intensifying period is. Next, a time limit is started by loading Tpip on a timer (the timer Tpip started: 44) to the state SL3=L (the first solenoid valve 3 open) and SL4=L (the second solenoid valve 4 close) (as shown in FIG. 1a) (45). Then the process returns to main routine.

When a content of the intensifying flag register BIS is found "1" through checking at the step (41) ("intensifying" having been effected after reducing=the timer Tpip having started: not "suddenly intensifying" in the previous control mode), whether or not time is over on the timer Tpip is checked (46), and if not, then since Tpip has not lapsed since the intensifying last time, the mode is turned to "hold" with SL3=H (the first solenoid valve 3 close), and SL4=L (the second solenoid valve 4 close) for carrying out "intensifying" thereafter (47), and the process returns to main routine. If time is over on the timer Tpip, then since Tpip has lapsed since the intensifying last time, the timer Tpip is restarted (44), "intensifying" is effected (45), and the process returns to main routine.

From the above-described process, where "reducing" (suddenly reducing ④ or pulse reducing ③) is not carried out while the state in which the brake pedal 1 is being stepped on, "suddenly intensifying" (0) is carried out immediately for a required period of time whenever it becomes necessary. The pumps 18, 18A are not driven. The reason is that the second solenoid valve 4 has been closed up to that time, and brake oil between the wheel brakes 8, 9 is not extracted through the first solenoid valve 3 (not enclosed in the accumulator 5), therefore brake oil in the brake system covering the master cylinder 2 to the wheel brakes 8, 9 is not decreased, that is, a brake pressure interlocking normally with a discharge pressure of the master cylinder is impressed (no reducing required). In the first intensifying (including suddenly intensifying and pulse intensifying) after reducing is carried out, the pumps 18, 18A are driven (stopped at the time of "pulse intensifying" ①, "hold" ②, "pulse reducing" ③ or brake getting off), Tpip is computed so as to effect the intensifying at a period more than Tpip and the timer Tpip is started. Before the time is over on the timer Tpip, even if "suddenly intensifying" or "pulse intensifying" is again decided, the mode is kept as "hold" until the time is over, and if "suddenly intensifying" or "pulse intensifying" is still required after the time is over, then intensifying is carried out and the timer Tpip is started.

Then, while "suddenly intensifying" (0) is decided to be necessary, "intensifying: SL3=L, SL4=L" is continued. Where "suddenly intensifying" (0) is kept continuous, contents of the mode register BMRs and the last time mode register BMRp are both zero. In such case, the process goes forward from (40) to (45) by way of the steps (39) and (40), and thus "intensifying" is kept going. Accordingly, while the mode is decided to be "suddenly intensifying" (0), "intensifying" is effected continuously during the period of time when decided substantially to be "suddenly intensifying (0)".

① "Control of pulse intensifying ①" (FIG. 4i):

When data written in the mode register BMRs indicates "pulse intensifying" ①, the process goes forward from (48) to (49), and whether or not content of the last mode register BMRp also indicates "pulse intensifying" ① is checked. If not (another mode previously), a content of the reducing flag register BDS is checked (50). If the content of BDS is "0", a standard period (fixed value) Tpips is written in the intensifying period register Tpip, the timer Tpip is started (55), a timer 6 msec. for specifying a term of "intensifying" of the pulse intensifying is started (56), the electric motor 19 is stopped (outputting "0" to MD), intensifying is effected with SL3=L (the first solenoid valve 3 open) and SL4=L (the second solenoid valve 4 close) (57), and the process returns to main routine. If the content of BDS is "1", then reducing has been carried out in the process from detection of stepping on the pedal 1 (9). The content of the intensifying flag register BIS is checked consequently (52). If the content of the intensifying flag register BIS is "0", then the situation is such that reducing (suddenly reducing or pulse reducing) is carried out after the brake pedal 1 is stepped on, and then intensifying (suddenly intensifying or pulse intensifying) is not carried out. Then, since the intensifying this time is a first one after reducing was effected, "1" is written in the intensifying register BIS (53). Then, an intensifying period:

$$Tpip = a \cdot Vpi^2 + b \cdot Vpi + c$$

is computed and written in the intensifying period register Tpip (54). Vpi is a content of the initial speed register Vpi, representing a wheel average speed Vmd when the brake pedal 1 is stepped on. The higher the initial speed Vpi is, the larger Tpip is. Next, the timer Tpip is started (55), the timer 6 msec. is started (56), and SL3=L (the first solenoid valve 3 open), SL4=L (the second solenoid valve 4 close) (57). Then the process returns to main routine.

When the content of the intensifying flag register BIS is "1" through checking at the step (52) (intensifying carried out after reducing=timer Tpip having started: last time control mode not pulse intensifying), whether or not time is over on the timer Tpip is checked (58), and if not, then since Tpip has not lapsed since the intensifying last time, the mode is turned to "hold" with SL3=H (the first solenoid valve 3 close), and SL4=L (the second solenoid valve 4 close) for carrying out "intensifying" thereafter (59), and the process returns to main routine. If time is over on the timer Tpip, then since Tpip has lapsed since the intensifying last time, the timer Tpip is restarted (55), the timer 6 msec. is started (56), "intensifying" is output (57), and the process returns to main routine.

When contents of the last mode register BMRp and the mode register BMRs are both "1" (pulse intensifying), the mode has already come into "pulse intensifying" and the steps (55) to (57) are carried out. In this case, therefore, the process goes forward to step (60) from step (49), and whether "intensifying" or "hold" is output currently (intensifying term or hold term in the pulse intensifying) is checked (60). If SL3=L, "intensifying" is being output, and if SL3=H, then "hold" is being output.

When "intensifying" is being output, whether or not time is over on the timer 6 msec. is checked to ensure that "intensifying" term of 6 msec. has been over (61). If the time is not over, the process returns straight to main routine (continuation of "intensifying"). If the time is over on the timer 6 msec., then SL3=H (hold), and the process returns to main routine.

When "hold" is being output, whether or not time is over on the timer Tpip is checked (63), and if the time is over, the process goes forward to the step (55) to transfer the mode to "intensifying". If the time is not over, the process returns straight to main routine (continuation of "hold").

If decision on pulse intensifying is continued according to the above-described process, the pulse intensifying is carried out as "intensifying" for 6 msec., "hold" for the next (Tpip−6) msec. and then "intensifying" for 6 msec. thereafter.

When "reducing" is not carried out before the above pulse intensifying, a repeated pulse intensifying is carried out right away at the standard period (fixed) Tpips with "intensifying" first for 6 msec. and then "hold" for (Tpips−6) msec.

When "reducing" is carried out but "suddenly intensifying" or "pulse intensifying" is not carried out before the above pulse intensifying, the period Tpip coordinating with the initial speed Vpi is set, and a repeated pulse intensifying is carried out right away with "intensifying" for 6 msec. and then "hold" for (Tpip−6) msec.

When "reducing" and "suddenly intensifying" or "pulse intensifying" are carried out before the above pulse intensifying, a pulse intensifying is carried out with "hold" until time is over on the timer Tpip set at the last suddenly intensifying or pulse intensifying, "intensifying" for 6 msec. when the time is over and then "hold" for (Tpip−6) msec. That is, "intensifying" of a renewed pulse intensifying after "reducing (suddenly reducing or pulse reducing)" is carried out; and also intensifying (suddenly intensifying or pulse intensifying) is commenced after time is over on the timer Tpip which started at the last "intensifying", and "hold" is carried out until the time is over.

Figure 4J:
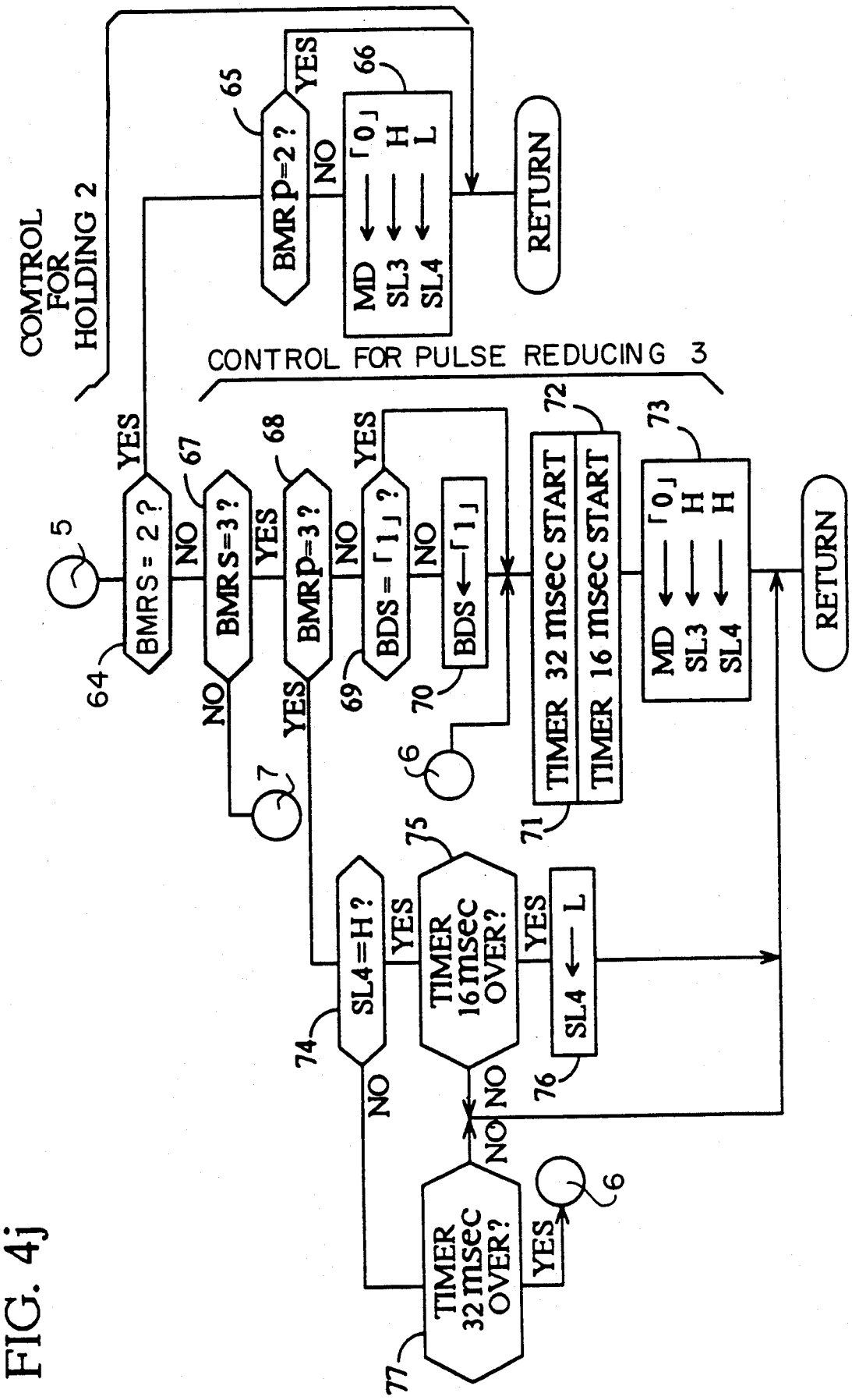
Figure 4K:
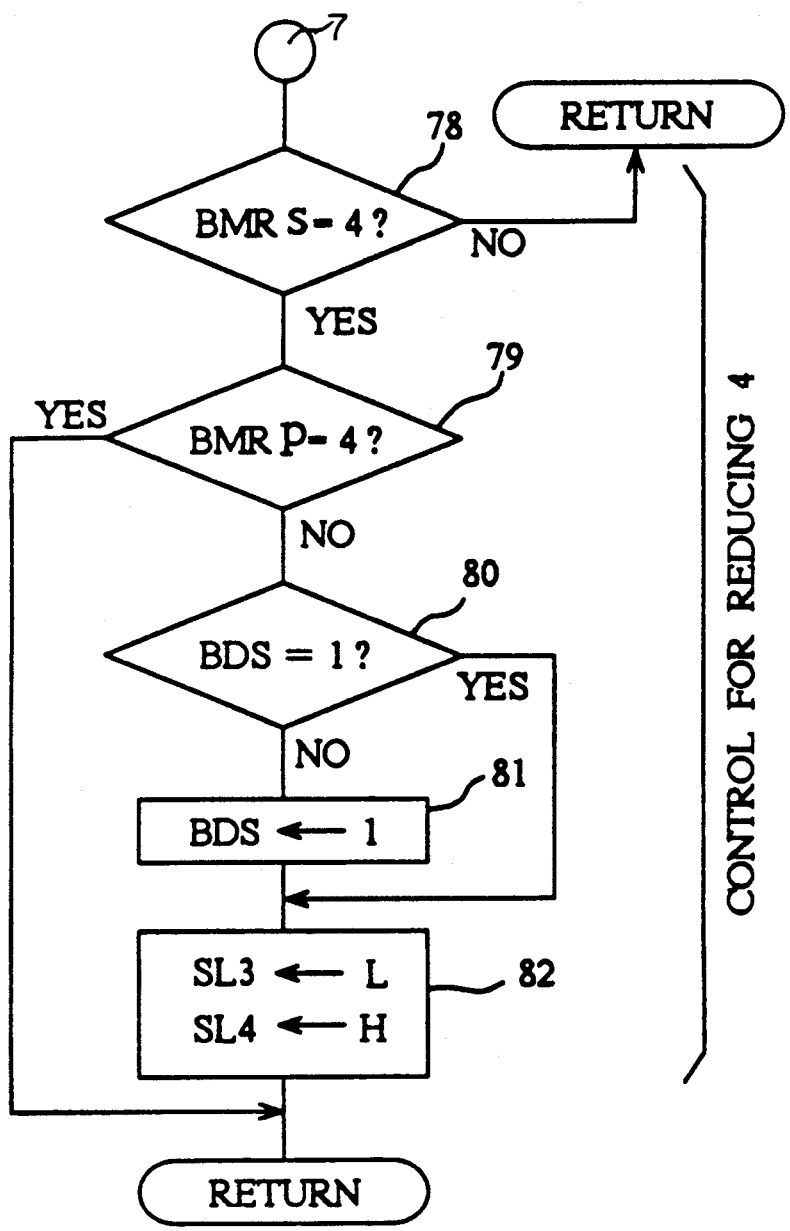

2 Control of "hold ②" (FIG. 4j)

When the data written in the mode register BMRs is "2" indicating "hold ②", the process goes forward to (65) from a step (64), and whether or not a content of the last mode register BMRp is "2" is checked. If "2", then "hold" was already carried out previously, which need not be changed, therefore the process returns to subroutine (3). If a content of the last mode register BMRp is not "2", the electric motor 19 is stopped (outputting "0" to MD), "hold" (SL3=H, SL4=L) is output (66), and then the process returns to main routine.

3 Control of "pulse reducing ③" (FIG. 4j)

A pulse reducing is repeated with "reducing (SL3=H: the first solenoid valve 3 close, SL4=H: the second solenoid valve 4 open)" for 16 msec. and then "hold (SL3=H: the second solenoid valve 3 open, SL4=L: the second solenoid valve 4 close)" for next 16 msec.

When the data written in the mode register BMRs is "3" indicating pulse reducing ③, the process goes forward to a step (68) from (67), and whether or not the content of the last mode register BMRp is "3" is checked. If not "3", then a content of the reducing flag register BDS is checked (69), and if it is "0", reducing is renewed at this time. Therefore, "1" is written in the reducing flag register BDS (70), the timer 32 msec. is started (71), the timer 16 msec. is also started (72), the electric motor 19 is stopped (outputting "0" to MD), "reducing" (SL3=H: the first solenoid valve 3 close, SL4=H: the second solenoid valve 4 open) is carried out (73), and the process returns to main routine. When the content of the reducing flag register BDS is "1", the step (70) is jumped and the steps (71 to 73) are carried out. When the content of the last mode register BMRp is also "3" (pulse reducing), since the timer 32 msec. has already been started, and "reducing" (time is not over on the timer 16 msec.) in the pulse reducing or "hold" (time is over on the timer 16 msec.) has been output, check is made on whichever falls (74).

If SL4=H, then the mode enters in the aforementioned "reducing", therefore whether or not time is over on the timer 16 msec. is checked (75), and when the time is over, SL4=L to "hold" (76), and the process returns to main routine. When the time is not over, the process returns straight (as "reducing") to main routine.

When SL4=L ("hold"), whether or not time is over, on the timer 32 msec. is checked (77), and if the time is not over, the process returns straight (as "hold") to main routine. When the time is over, the timer 32 msec. and the timer 16 msec. are started (71, 72) to "reducing" (73), and the process returns to main routine.

When the mode is decided to be "pulse reducing ③" as above, first "reducing" is output for 16 msec., "hold" is output for the next 16 msec., and thus "reducing" and "hold" are repeated alternately so long as the decision of "pulse reducing ③" lasts. ④ "Control of suddenly reducing ④" (FIG. 4k):

When the data written in the mode register BMRs is "4" indicating "suddenly reducing ④", the process goes forward to a step (79), and whether or not the content of the last mode register BMRp is "4" (suddenly reducing ④) is checked (79). If the content of BMRp is also "4", then the state is such that "reducing" has already been output, therefore the process returns to main routine. If the content of BMRp is not "4", "1" is written in the reducing flag register BDS to output "reducing" (82), and the process returns to main routine.

When the mode is decided to be "suddenly reducing ④ as above, "reducing" is output continuously so long as the decision lasts.

With reference to FIG. 4c, a content of "brake oil reflowing" (200) will be described in detail.

When the brake detection switch BSW is reopened, the microprocessor 11 detects it at step (9) and writes "0" in a brake flag register BSF (83). That is, BSF is cleared. Next, the first solenoid valves 3, 3A are opened (SL3, 3A=L) (84), and whether or not a content of the reducing flag register BDS is "1" (brake oil being discharged to the reservoirs 20, 20A) is checked (85). If the content of BDS is "0", the second solenoid valves 4, 4A are closed (SL4, 4A=L) (86) to "intensifying", and the process returns to subroutine (3).

When the content of the reducing flag register BDS is "1", the electric motor 19 is stopped (pumps 18, 18A being stopped: outputting "0" to MD), and for extracting pressures on the wheel brakes and returning the brake oil in the reservoirs 20, 20A to the master cylinder 2, SL4, 4A=H (the second solenoid valves 4, 4A open) (87), and a content of the lapse flag register t₀F is checked (88). If the content of t₀F is "0", the timer t₀ is started (89), and "1" is written in the lapse flag register t₀F. Then the process returns to main routine. In this case, "1" indicates that the timer t₀F has been started (the wheel brake pressures being extracted and the brake oil being returned to the master cylinder 2). Then, the time t₀ is slightly longer than the time necessary for the wheel brake pressures and pressure of the master cylinder 2 to return to a steady value, remaining while brakes are not stepped on.

If the content of t₀F is "1", whether or not time is over is checked on the timer t₀ (91), and when the time is not over, the process returns to main routine, but when the time is over, SL4, 4A=L (the second solenoid valves 4, 4A close to "intensifying"), the reducing flag register BDS and the intensifying flag register BIS are cleared, the lapse flag register t₀F is also cleared (92), and the process returns to main routine.

Then, if the pedal 1 is stepped on before time is over on the timer t₀, the process goes forward to the step (10) from (9), then goes to (11) for initialization (300) to "intensifying" (as shown in FIG. 1a) and runs the aforementioned antiskid control. In this case, the process passes over the step (92) (FIG. 4c), and thus BDS and BIF are not cleared, therefore, an antiskid control corresponding to the previous antiskid control when the pedal 1 was stepped on, is carried out.

According to the antiskid control of the microprocessor 11 described as above, when brakes are applied, for example, on a slippery road surface, "reducing", "hold" and "intensifying" of the brake pressures are carried out. As shown in FIG. 5a in accordance with existing high car speeds (Vpi, Vpia), the period Tpip (Tpipa) of "intensifying", after "reducing" is once carried out, is long to correspond to Vpi (Vpia). However, when the car speeds (Vpi, Vpia) at the time of braking are low, the period Tpip (Tpipa) of "intensifying" is short to correspond to Vpi (Vpia).

As described hereinbefore, "pulse intensifying" takes 6 msec. "intensifying"+(Tpip−6) msec. or (Tpipa−6) msec. as one period, therefore "intensifying" is of low duty (6 msec./Tpip or 6 msec./tpia) when the initial speed Vpi (Vpia) is high but is of high duty when the initial speed Vpi (Vpia) is low.

After all, if car speeds, (initial speeds Vpi, Vpia) when the brake pedal 1 is stepped on, are high, "pulse intensifying," after "reducing" is once carried out becomes low in duty, or low in climbing speed, the probability of reducing thereafter is low, or the reducing time is short. Hence, rate of flow of brake oil to the reservoir 20 (20A) is low; and since the initial speed Vpi (Vpia) is high, the antiskid control will last relatively long. Therefore, the capacity of the pump 18 (18A) may be minimized.

If car speeds are low(initial speeds Vpi, Vpia) when the brake pedal 1 is stepped on, pulse intensifying, after "reducing" is once carried out, becomes high in duty, or in other words high in gaining speed, and the probability of reducing thereafter is high, or the reducing time is long. Hence the return rate of brake oil to the reservoir 20 (20A) is high. However, since the initial speed Vpi (Vpia) is low, the antiskid control will end in a relatively short time, therefore the capacity of the pump 18 (18A) may be minimized.

Then, in the embodiment described above, "intensifying" on the second time and thereafter, will be effected Tpip (Tpipa) after a previous "intensifying" was commenced in a recurrence of "suddenly intensifying (0)", after "reducing" is once carried out. Therefore "intensifying" is suppressed when Vpi (Vpia) is high in this aspect. Hence a frequency of carrying out "reducing" is low, or the reducing time is short. Thus the necessary capacity of the pump 19 (19A) may be minimized.

A variant of the invention will be described next. In the above-described embodiment, the second solenoid valves 4, 4A operate simply for opening/ closing. Therefore the second solenoid valves 4, 4A are opened immediately after the brake pedal 1 is released at the steps (83) to (92). Thus, brake oil contained in the reservoir 20 (20A) is returned to the brake master cylinder 2 in response to the suction of the brake master cylinder 2, which is caused by reset of the pedal 1. In the variant, with the second solenoid valves 4, 4A closed, the brake oil in the reservoir 20 (20A) may flow in oil passages BOL, BOLA between the first solenoid valves 3, 3A and the wheel brakes by way of an orifice and a check valve. Thus, when the brake pedal 1 is released, the first solenoid valves 3, 3A are reopened, and a negative pressure of the master cylinder 2 is applied on the passages BOL, BOLA. The brake oil in the reservoirs 20, 20A is returned to the passages BOL, BOLA despite the second solenoid valves 4, 4A being closed. Now, therefore, brake oil reflowing process given in the steps (85) to (91) may be omitted in the mode of operation. Then, the aforementioned orifice may be omitted, too.

Further, in the aforementioned mode of operation, the duty is set by periods Tpip, Tpipa for pulse intensifying, however, with the periods Tpip, Tpipa fixed (constant) in value, a term of "intensifying" in the pulse intensifying may be set in accordance with the initial speeds Vpi, Vpia. For example, if the term of "intensifying" is Tx (variable), and the period is Tss (fixed):

$$6/Tpip = 6/a \cdot Vpi^2 + b \cdot Vpi + c) = Tx/Tss$$

thus $$Tx = 6Tss/(a \cdot Vpi^2 + b \cdot Vpi + c)$$

In the mode of operation, the time period of "intensifying" in the pulse intensifying mode will be specified at a value corresponding tot he initial speed Vpi by a counter.

Further, in the aforementioned mode of operation, while the additional pumps 18, 18A are provided, the additional pumps may be omitted, and the reservoirs 20, 20A may be superseded by accumulator for low pressure, application. Then, in the mode of operation, the frequency of "intensifying" after "reducing" is once carried out, which is high in accordance with the initial speeds Vpi, Vpia, will be suppressed. Therefore, the capacity of the accumulator for low pressure application may be minimized in design.

Still further, in the above-described embodiment, the control mode domain is segmented by a straight line as shown in FIG. 2a to FIG. 2c. However, the segment boundary may be curved. That is, in "mode decisions 1, 1A" described hereinbefore, the control mode may be decided by means of a curve equation instead of the straight line equation.

In any case, according to the invention, necessary functions are specified by substituting specific constants (K1, G1 and so forth) for the functions (straight lines in the above-described embodiment). For segmenting the control mode domain, one (Vmd) of the parameter (Sp) determined by the then wheel speed and car speed and the wheel acceleration speed Vmd is substituted for the specified function to obtain a value (SPa) compared with the other (Sp), and the control mode is decided by comparing (SPa) with (Sp). Thus, the functions to be used and the aforementioned constants may simply be loaded in the microprocessor or separate ROM or RAM, and hence the memory capacity for storing these may be minimized. Be that as it may, high resolution data representing the aforementioned parameter (Sp) and/or wheel acceleration speed Vmd may be used. That is, uniformity between resulting operation and the decision result are obtainable; with a minimum number of segmented stages and the invention will thus be contributory to intensifying or reducing wheel brake pressures smoothly for antiskid control in line with the control mode, which comprises domains of three or more including "reducing", "hold" and "intensifying".

What is claimed is:

1. Apparatus for controlling braking pressure of a vehicle wheel brake, comprising:

normally-open first valve means disposed between a fluid pressure source and the wheel brake for controlling the passage of brake fluid between the fluid pressure source and the wheel brake;

normally-closed second valve means disposed between the first valve means and the wheel brake for maintaining the brake fluid at a low pressure;

detection means for detecting a wheel speed of a brake equipped wheel;

means for arithmetically computing a reference speed and wheel acceleration in accordance with the detected wheel speed;

first valve control means responsive to a "reducing" control mode for closing the first valve means and opening the second valve means for reducing the brake pressure of the wheel;

second valve control means responsive to an "intensifying" control mode for opening the first valve means and closing the second valve means for increasing the brake pressure of the wheel;

third valve control means responsive to a "hold" control mode for closing both said first and second valve means for maintaining the brake pressure of the wheel;

memory means for storing constants for specifying functions indicating boundaries of at least the "reducing", "intensifying" and "hold" domains in a two dimensional plane, including (a) the wheel acceleration, (b) an operational parameter determined by the wheel rotational speed and the reference speed, as variables;

means for deciding one of the control modes by obtaining a calculated value by utilizing the constants and either one of (a) the wheel acceleration arithmetically computed by the arithmetic means, or (b) the operational parameter corresponding to the wheel rotational speed detected by the detection means and the reference speed arithmetically computed by the arithmetic means; and comparing the obtained calculated value with the other of (a) said wheel acceleration, and (b) said operational parameter not utilized in obtaining said calculated value in order to judge whether the calculated value is located in "reducing", "intensifying", or "hold" domain; and means responsive to the control mode decision for selecting one of the "reducing", "intensifying", and "hold" control modes.

2. Apparatus for controlling braking pressure of a vehicle wheel brake, comprising:

normally-open first valve means disposed between a fluid pressure source and the wheel brake for controlling the passage of brake fluid between the source and the wheel brake;

normally-closed second valve means disposed between the first valve means and the wheel brake for maintaining the brake fluid at a low pressure;

detection means for detecting a wheel speed of the brake equipped wheel;

deceleration means for detecting deceleration of the vehicle;

means for arithmetically computing a reference speed and wheel acceleration in accordance with the detected wheel speed;

first valve control means responsive to a "reducing" control mode for closing the first valve means and opening the second valve means for reducing the brake pressure of the wheel;

second valve control means responsive to an "intensifying" control mode for opening the first valve means and closing the second valve means for increasing the brake pressure of the wheel;

third valve control means responsive to a "hold" control mode for closing both said first and second valve means for maintaining the brake pressure of the wheel;

memory means for storing constants for specifying functions indicating boundaries of at least the "reducing", "intensifying", and "hold" domains in a two dimensional plane, including the wheel acceleration, an operational parameter determined by the speed of wheel rotation, and the reference speed as variables;

constant designating means for designating constants corresponding to the detected deceleration;

means for deciding one of the control modes by obtaining a calculated value by utilizing one of the constants designated by the constant designating means and either one of (a) the wheel acceleration arithmetically computed by the arithmetic means or (b) the operational parameter corresponding to the wheel rotational speed detected by the detecting means and the reference speed arithmetically computed by the arithmetic means; and comparing the obtained calculated value with the other of (a) said wheel acceleration and (b) said operational parameter, not utilized in obtaining said calculated value, respectively in order to judge whether the calculated value is located in the "reducing", "intensifying", or "hold" domain; and means responsive to the control mode decision for selecting one of the "reducing" "intensifying" and "hold" control modes.

3. The brake pressure control apparatus as defined in claim 2, wherein said deceleration detection means includes a deceleration arithmetic means for computing said deceleration from the reference speed calculated by said arithmetic means, a second reference speed calculated by said arithmetic means at a time $T_1$ earlier than said calculation of said reference speed, and from said time $T_1$.

4. Apparatus for controlling braking pressure of a vehicle wheel brake comprising:

normally-open first valve means disposed between a fluid pressure source and the wheel brake for controlling the passage of brake fluid between the fluid pressure source and the wheel brake;

normally-closed second valve means disposed between the first valve means and the wheel brake for maintaining the brake fluid at a low pressure;

detection means for detecting a wheel speed of a brake equipped wheel;

means for arithmetically computing a reference speed and wheel acceleration in accordance with the detected wheel speed;

first valve control means responsive to a "reducing" control mode for closing the first valve means and opening the second valve means for reducing the brake pressure of the wheel;

second valve control means responsive to an "intensifying" control mode for opening the first valve means and closing the second valve means for increasing the brake pressure of the wheel;

third valve control means responsive to a "hold" control mode for closing both the first and second valve means for maintaining the brake pressure of the wheel;

memory means for storing constants for specifying functions indicating boundaries of at least the "reducing", "intensifying" and "hold" domains in a two dimensional plane, including (a) the wheel acceleration and (b) operational parameter determined by the wheel speed and the reference speed as variables;

means for deciding one of the control modes by utilizing the constants and at least either one or the other of (a) the wheel acceleration arithmetically computed by the arithmetic means and (b) the operational parameter corresponding to the wheel rotational speed detected by the detection means and the reference speed arithmetically computed by the arithmetic means, in order to judge whether the calculated value is located in "reducing", "intensifying" or "hold" domain; and means responsive to the control mode decision for selecting one of the "reducing", "intensifying" and "hold" control modes.

* * * * *